United States Patent [19]

Veldman et al.

[11] Patent Number: 5,669,698
[45] Date of Patent: Sep. 23, 1997

[54] MODULAR REARVIEW MIRROR ASSEMBLY AND METHOD FOR MAKING SAME

[76] Inventors: Roger L. Veldman, 608 W. 29th St., Holland, Mich. 49423; Brent J. Bos, 458 W. Main Ave., Zeeland, Mich. 49464

[21] Appl. No.: 448,883

[22] Filed: May 24, 1995

[51] Int. Cl.$^6$ ............................................. B60Q 3/02
[52] U.S. Cl. .................... 362/83.1; 362/80; 362/140; 362/234; 362/241; 362/245; 362/251
[58] Field of Search ....................... 362/61, 74, 75, 362/83.1, 135, 140, 141, 142, 80, 234, 237, 240, 241, 244, 245, 247, 249, 251

[56] References Cited

U.S. PATENT DOCUMENTS

| D. 351,370 | 10/1994 | Lawlor et al. | D12/187 |
|---|---|---|---|
| 2,414,223 | 1/1947 | De Virgilis | 362/83.1 |
| 4,443,057 | 4/1984 | Bauer et al. | 350/281 |
| 4,646,210 | 2/1987 | Skogler et al. | 362/142 |
| 4,733,336 | 3/1988 | Skogler et al. | 362/142 |
| 4,807,096 | 2/1989 | Skogler et al. | 362/142 |
| 4,886,960 | 12/1989 | Molyneux et al. | 250/209 |
| 5,140,455 | 8/1992 | Varaprasad et al. | 359/275 |
| 5,151,816 | 9/1992 | Varaprasad et al. | 359/275 |
| 5,178,448 | 1/1993 | Adams et al. | 362/83.1 |
| 5,327,288 | 7/1994 | Wellington et al. | 359/606 |
| 5,521,760 | 5/1996 | De Young | 359/601 |

FOREIGN PATENT DOCUMENTS

615882A2  9/1994  European Pat. Off. .

OTHER PUBLICATIONS

N.R. Lynam, "Electrochromic Automotiva Day/Night Mirror," *SAE Technical Paper Series*, 8706362/1987).
N.R. Lynam, "Smart Windows for Automobiles," *SAE Technical Paper Series*, 900419 Mar. 1990).
N. R. Lynam and A. Agrawal, "Automotive Applications of Chromogenic Materials," *Large Area Chromogenics: Materials and Devices for Transmittance Control*, C.M. Lampert and C.G. Granquist, EDS, Optical Engineering Press, Washington, (1990).

*Primary Examiner*—Alan Cariaso
*Attorney, Agent, or Firm*—Van Dyke, Gardner, Linn & Burkhart, LLP

[57] ABSTRACT

A modular rearview mirror assembly for vehicles incorporates one or more integrated subassembly modules or carrier members to which are connected separate electrical components such as lamps, reflectors, switches, plug receptacles and the like to simplify mirror assembly and provide integral support, electrical connections, and an electrical distribution network for the mirror assembly having added, electrically operated features. The carrier member includes a circuit member secured to and/or at least partially encased or encapsulated within a support body such that electrical connections extend therefrom. An improved mirror assembly method using such a carrier member is also provided.

71 Claims, 9 Drawing Sheets

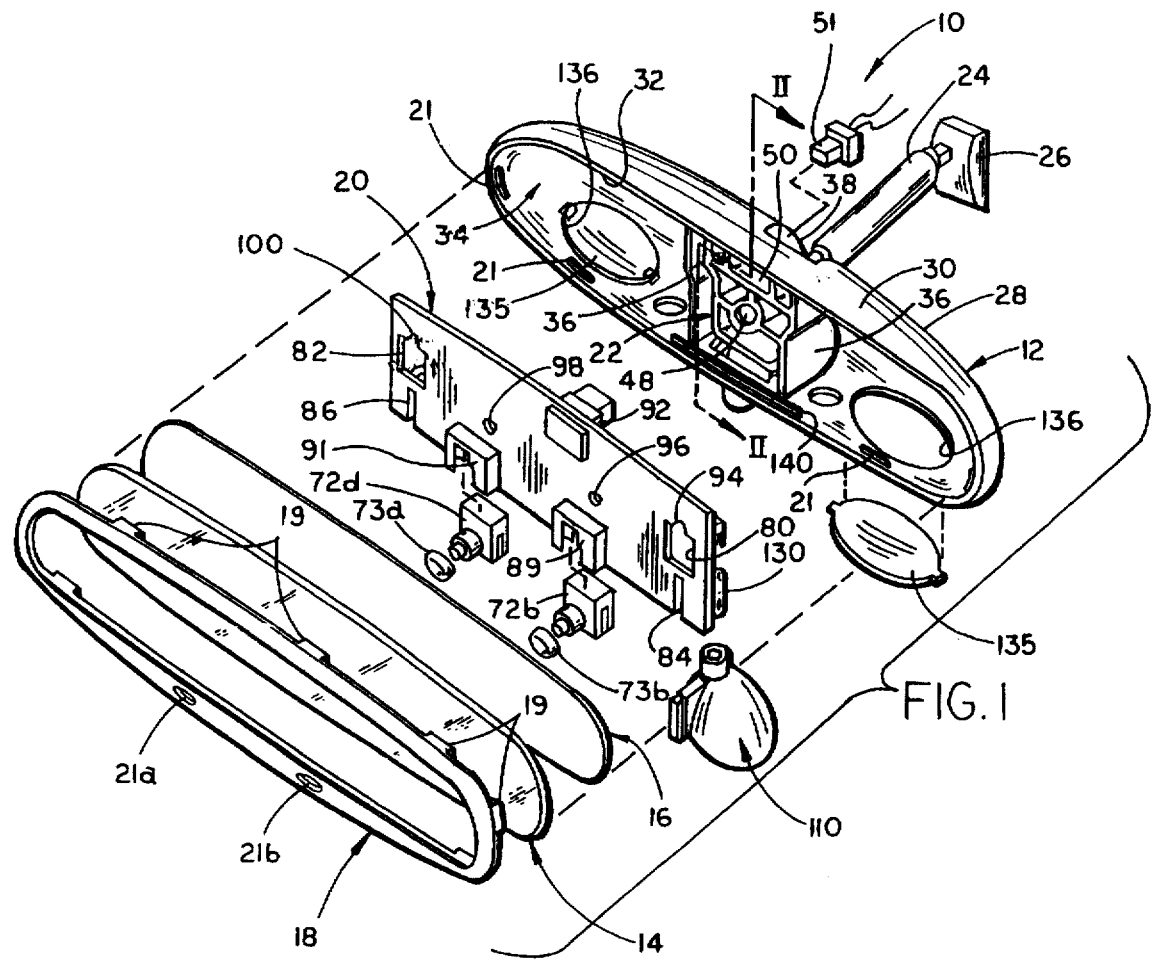
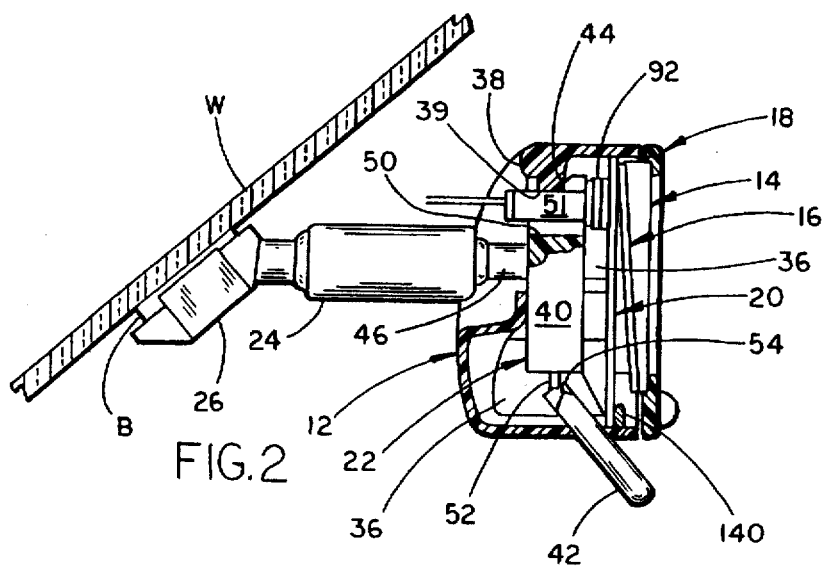

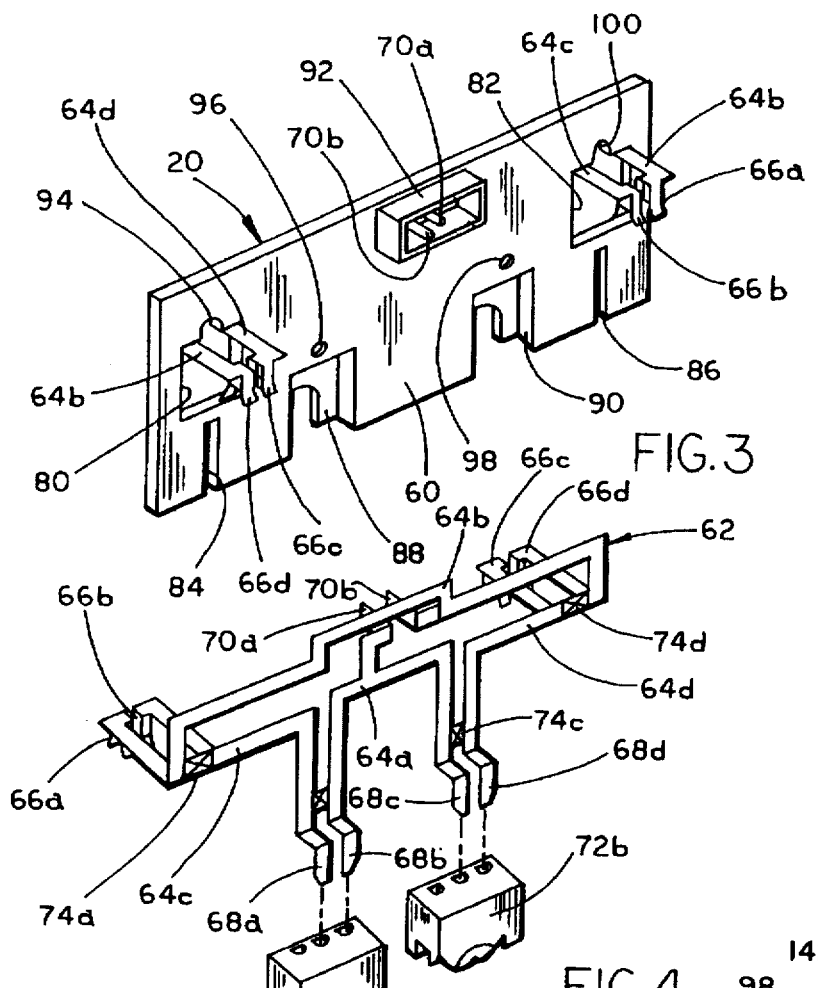

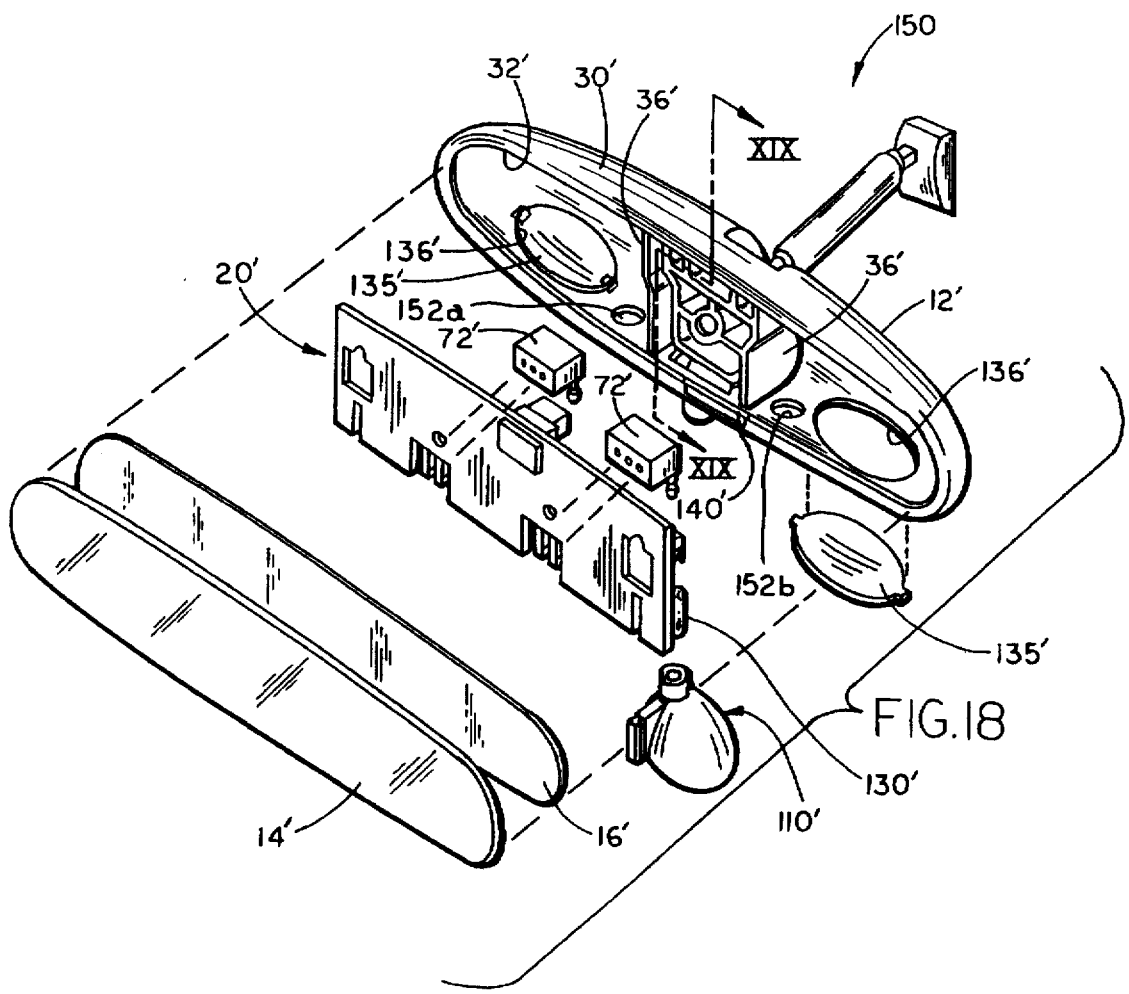
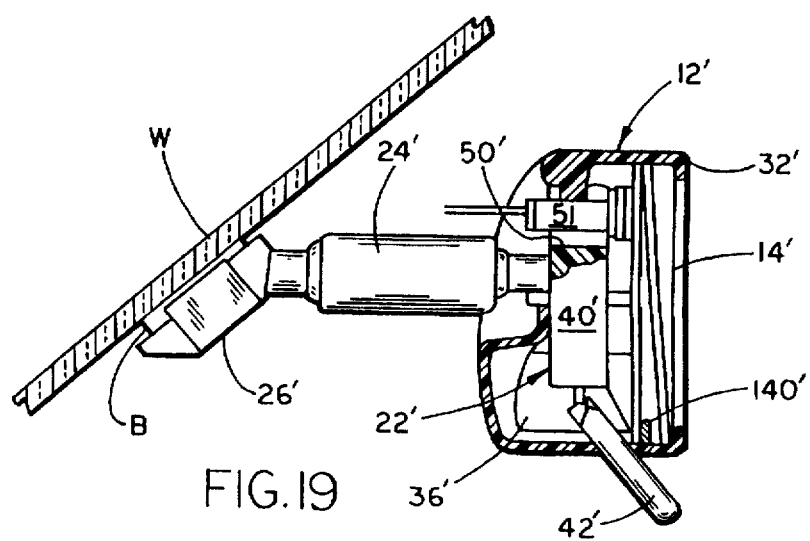

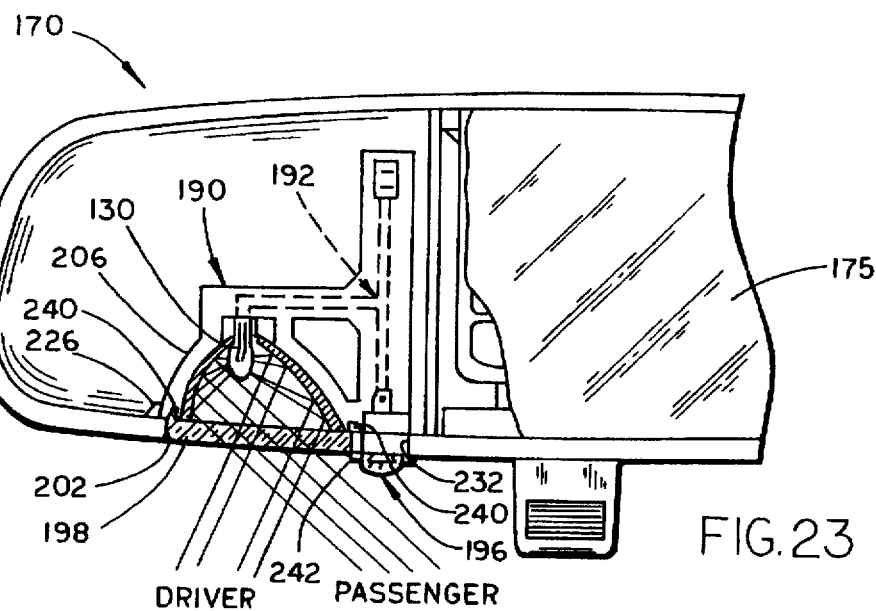
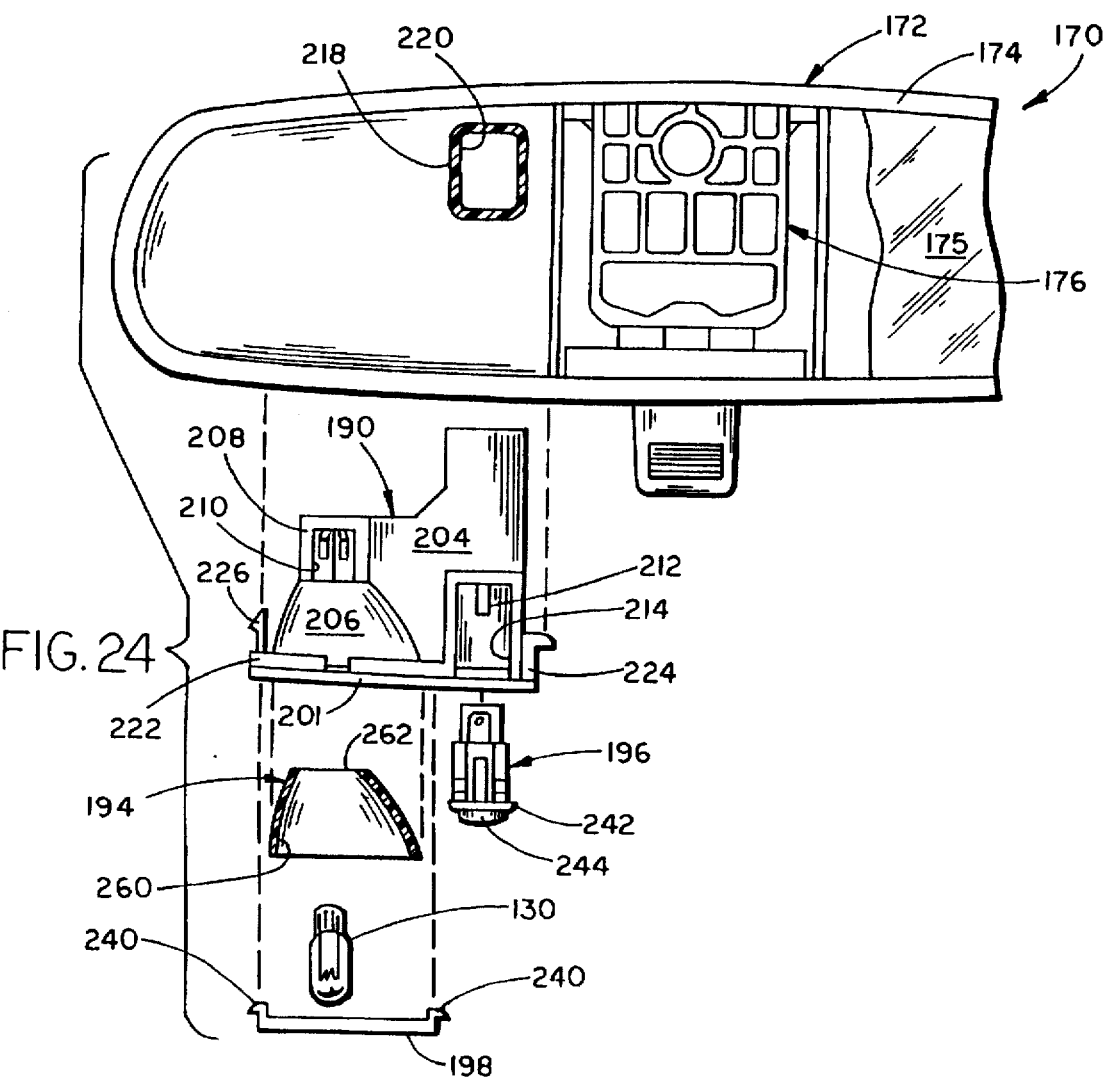

MODULAR REARVIEW MIRROR ASSEMBLY AND METHOD FOR MAKING SAME

BACKGROUND OF THE INVENTION

This invention relates to rearview mirrors for vehicles and, more particularly, to an improved, modular rearview mirror assembly incorporating electrical components such as lamps and switches within the assembly for illumination of various portions of the vehicle interior, displays or other instruments of various types all of which are mounted and assembled via an integrated carrier member.

Prior rearview mirror assemblies for vehicles incorporating lamp assemblies with map or reading lights, switches, or other instrumentation such as compasses, light sensors and controls therefor, while functioning well for their intended purposes, have been relatively complicated, involved and expensive to manufacture on a high volume basis. More specifically, many operations have been necessary to properly assemble the various parts in a rearview mirror housing or case having such additional features to arrive at the desired product. These various parts have, in many cases, been difficult and tedious to handle and position requiring high intensity, expensive manual labor which has prevented the cost of such assemblies from being reduced.

For example, in the lighted rearview mirror assembly of U.S. Pat. Nos. 4,733,336 and/or 5,178,448, a molded plastic case is provided with a day/night toggle actuator and a support arm for mounting the assembly on a windshield mounted button, header support or the like. In order to manufacture that assembly, the day/night toggle actuator and support arm must be mounted within the case followed by insertion of appropriate reflector housings, and a wire harness/assembly incorporating a plug receptacle for mounting on the mirror housing, appropriate lamp or bulb holders, and appropriate switches, all of which must be inserted and mounted within the case. The wire harness/assembly itself requires separate assembly prior to insertion in the mirror housing so as to incorporate the necessary switches, bulb holders, plug connection and soldered or clip-type wire joints. These many connections and handling requirements create numerous possibilities for failure and improper wiring. In addition, the above assembly procedures have required extraordinary amounts of assembly time and manual labor, thereby driving up or preventing reductions in the cost of such assemblies.

The above assembly procedures have also restricted and/or prevented use of certain types of rearview mirror housings or cases. For example, the use of molded, polymeric rearview mirror housings in which a prismatic mirror element is snapped in place after molding of the housing and while the housing was still in a warm, somewhat soft and pliable state was very difficult because of the required assembly time for inserting the lamps, reflectors, bulb holders, plug connections, switches, wiring harnesses and the like, all before insertion of the reflective prism in sufficient time to allow a shrink fit of the mirror case around the mirror element.

In addition, prior commercially successful lighted mirrors formed from resinous plastic materials have also typically required the use of temperature resistant, high heat deflection temperature resins in order to withstand the high levels of heat generated therewithin by the lamps and other electrical components. Such temperature resistant resins are higher in cost making such assemblies more expensive.

Accordingly, an improved rearview mirror assembly for vehicles incorporating lamp assemblies or other electrical components such as instrumentation or controls, and an improved manufacturing method was desired for simplified assembly, increased reliability, increased heat management, reduction in assembly time, and flexibility for use with different types and styles of mirror housings and cases.

SUMMARY OF THE INVENTION

The present invention provides an improved modular rearview mirror assembly for vehicles incorporating lamps or other electrical components, instrumentation and/or controls which provides an economical assembly useful with many different mirror case shapes and housing styles with resultant increased durability and reliability, improved heat management, as well as reduced manufacturing complexity and time. In addition, an improved manufacturing method for making such modular rearview mirror assemblies is also provided.

In one aspect, the invention provides a modular rearview mirror assembly for vehicles including a case for supporting a mirror element, the case having at least one opening therethrough, a reflective mirror element supported and retained by the case, and a support on the assembly for mounting the assembly on a vehicle. A modular carrier member is formed separately from and mounted on the case. The carrier member includes an electrically conductive circuit member and a support body. The circuit member is formed separately from and secured to the support body, and provides an integral support, electrical connections for, and an electrical distribution network to at least one lamp on the case. A lamp is mounted on the carrier and connected to the circuit member and is adapted to provide light through the case opening to a portion of the vehicle when the mirror assembly is mounted therein.

In another aspect of the invention, the invention provides a modular rearview mirror assembly for vehicles including a mirror case, reflective mirror element, support for mounting the assembly on a vehicle and a modular carrier member all as set forth above. In this aspect of the invention, however, the carrier member provides an integral support, electrical connections for, and an electrical distribution network to at least one electrical component on the case. The case includes an electrical component mounted on the carrier member, which component is connected to the circuit member for operation on the mirror assembly. In a preferred form of this aspect of the invention, the carrier member also includes an electrical switch connected to the circuit member for controlling operation of the electrical component. Preferably, that switch is accessible for operation at the exterior surface of the mirror case.

Other preferred features of the invention include the provision of a reflector for reflecting light from the lamp through the case opening for illuminating portions of the interior of the vehicle such as the driver seating area, passenger seating area or both. The carrier member may also include an electrical switch, and a lens over the light opening. In preferred forms of the invention, a pair of lamps and openings through the mirror case are provided, each having a reflector and electrical switch for controlling same, as well as a lens over the opening.

The invention may be used with various types of rearview mirror cases such as those using a preformed bezel for retaining the mirror element within the case, the electrical switches for the lamps being accessible through the front of such bezel. Alternately, this invention makes commercially possible the molding of a one-piece mirror housing where a preformed, premolded lip is formed in one-piece on a molded resinous mirror case to allow snap-in insertion of a mirror element while the case is still warm and flexible and wherein the electrical switches for controlling the lamps are accessible from the bottom of the mirror assembly. Such one-piece housings are preferably made from polyolefin resins such as polypropylene or polypropylene/polyethylene copolymers having lower heat deflection temperatures, higher material shrinkage rates, and lower cost. A plug connection to a power source external of the mirror assembly may also be provided for access through an opening in the case. Mirror cases for both interior and exterior use on a vehicle are also contemplated.

In a preferred form, the circuit member of the present invention is preferably integrally molded to be at least partially encapsulated and/or encased within a resinous, polymeric support body preferably by insert molding to form the carrier member such that various sets of electrical connections extend from the molded body for connection to switches, light bulbs or other electrical components. The reflectors used with the lamps in the invention may be separately molded with metalized reflective surfaces and removably mounted to the carrier member in alignment with the lamp or light bulb, or may be formed from metal and inserted in an appropriate receptacle in the carrier member. Both regular and compound parabolic reflector shapes are contemplated.

In another preferred form of the invention, the carrier member may provide a single lamp and reflector which illuminates both the driver and passenger seating areas in the front of the vehicle. In this form, the carrier member includes a lamp or light bulb, reflector, switch, integral circuit member and plug receptacle for connection to an external power source all in a single unit which may be removably inserted from the exterior of the case, either before or after mounting of the reflective mirror element. This form allows repair and servicing of the lamp and carrier member following manufacture.

In yet another aspect of the invention, a method for assembling a modular rearview mirror for vehicles includes the steps of providing a mirror case for supporting a reflective mirror element and a lamp for illuminating a portion of a vehicle, forming a modular carrier member by securing a separate electrically conductive circuit member to a non-electrically conductive, insulating support body, forming a subassembly by connecting the lamp to the modular carrier member to provide both support and electrical connections for the lamp, mounting the modular carrier member and lamp subassembly on the mirror case such that the lamp is in registry with an opening in the case, and mounting a reflective mirror element on the mirror case such that the modular carrier member is concealed on the mirror case while the lamp is positioned to provide illumination through the opening in the case when the rearview mirror is mounted on a vehicle. The carrier member is preferably molded using any of injection molding, compression molding, extrusion molding, reaction injection molding or casting. The carrier member may also be formed in two sections which are fastened together at least partially around the circuit member, or by forming the support body and attaching the preformed circuit member to at least one surface of the support body.

Accordingly, the present invention provides simplified assembly of lighted and other rearview mirror assemblies having electrical components therein by incorporating a separately formed carrier member providing an integrated subassembly module which allows the docking and assembly of differing reflectors, bulbs, switches, external electrical connectors, or other electrical components to adapt use of the board to differing mirror case shapes and housings. The carrier member is easy to grasp and install and avoids tangling, breaking and disconnection of individual wires as in previously known wire harness assemblies. The carrier member will receive differing reflectors for different vehicles to provide different illumination areas and angles, can be provided with receptacles for receipt of integrated circuit boards, allows the use of integral molding of switch bodies therein, and is easily adapted for use with either two-piece bezel-type or one-piece, snap-in, molded mirror cases and housings. The reflectors are highly efficient and reduce heat generated in the assembly by allowing use of less powerful lamps which, in turn, allows use of lower heat deflection temperature resins which are cheaper and provide one-piece molding capabilities. The carrier member can also be molded in different configurations for each specific type of vehicle so as to mount lamps or light bulbs at particular angles and positions required for each vehicle. The carrier member also allows assembly within differing mirror housings to provide different variations in mirror styling while also providing increased utility. In addition, when mounted in a day/night rearview mirror assembly using a toggle actuator, the carrier member provides a strengthening member or reinforcement to maintain the toggle actuator in place in the event of impact from airbag inflation.

These and other objects, advantages, purposes and features of the invention will become more apparent from a study of the following description taken in conjunction with the drawings.

BRIEF DESCRIPTION OF THE DRAWINGS

FIG. 1 is an exploded, perspective view of a first embodiment of the modular rearview mirror assembly for vehicles of the present invention;

FIG. 2 is a sectional end elevation of the mirror assembly of FIG. 1 taken along line II—II of FIG. 2;

FIG. 3 is a perspective view of a preferred form of the carrier member for use in the mirror assembly of FIGS. 1 and 2;

FIG. 4 is an exploded, perspective view of a preferred form of a stamped metal electrical circuit adapted for insert molding within the carrier member of FIG. 3 and illustrating plug-in attachment of preferred plunger switches thereto;

FIG. 5 is an exploded, perspective view of the carrier member of FIG. 3 incorporating light bulbs and reflectors for same;

FIG. 18 is an exploded, perspective view of a second embodiment of the modular rearview assembly of the present invention;

FIG. 19 is a sectional side elevation of the rearview mirror assembly of FIG. 18 taken along line XIX—XIX of FIG. 18;

FIG. 23 is a fragmentary, front elevation, shown partially in section, of the mirror assembly of FIG. 22;

FIG. 24 is an exploded, front elevation of the mirror assembly of FIGS. 22 and 23;

DESCRIPTION OF THE PREFERRED EMBODIMENTS

Figure 6:
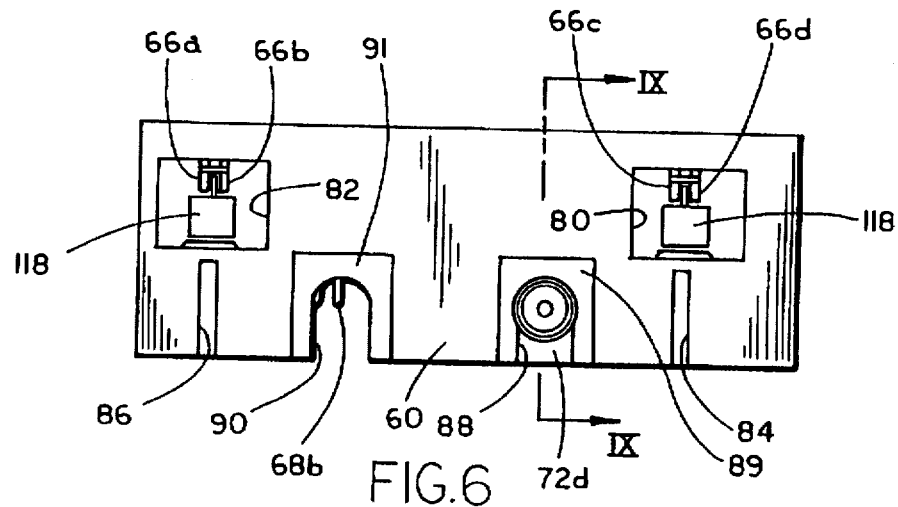
FIG. 6 is a front elevation of the carrier member of FIGS. 3 and 5 from the side opposite that shown in those figures.

Referring to the drawing figures in greater detail, the terms "top," "bottom," "front," "back," "tear," "forward," "horizontal" and "vertical" are used for reference purposes only and are not intended to limit the scope of protection for the invention.

FIGS. 1–17 illustrate a first embodiment 10 of the modular rearview mirror assembly of the present invention including a molded, resinous plastic mirror housing having a case 12 and a mirror element retaining bezel 18, a reflective mirror element 14, a resinous, polymeric, shatterproofing layer 16 applied to the rear surface of the reflective element 14, and a modular carrier member or integrated subassembly module 20 which, as is more fully explained below, is mounted within the hollow interior of molded case 12 prior to fitting of the reflective mirror element 14. Carrier member 20 provides an integral support, electrical connections, and an electrical distribution network for one or more electrical components used within mirror assembly 10 such as a lamp or light bulb 130, electrical switches 72 for controlling the lamp or light bulb, a plug connection 92 for connecting the carrier member or subassembly to an external power source, or a receptacle for a printed circuit board which could be used for control and operation of instrumentation, information readouts or other electronic devices within the vehicle. Carrier member 20 also receives and mounts reflectors 110, 112 adapted to direct light from lamps or bulbs 130 through one or more openings 136, which openings are preferably closed and covered by lenses 135. Mirror assembly 10 also preferably includes a day/night toggle actuator assembly 22 connected to a pivotally adjustable support arm 24 and a mounting bracket 26 adapted to be received on windshield mounted button B on windshield W (FIG. 2), or on a header mount at the upper edge of the windshield in conventionally known fashion. Once carrier member 20 is mounted within mirror case 12 after insertion of actuator assembly 22, reflective mirror element 14 is assembled within the mirror case and retained in position by front mounted retaining bezel 18 having flanges or projections 19 spaced thereround for engaging the inner surface of the periphery of mirror case 12 (FIG. 1). Projections 19 are preferably received and ultrasonically welded in mounting brackets 21 spaced around the interior of the peripheral wall 30 of case 12. Bezel 18 alternately may be adapted for snap-fitting into place via projections 19.

Preferably, mirror case 12 is molded in one piece and includes a back or rear wall 28 and a continuous peripheral, side wall 30 defining a peripheral edge 32 and a front opening 34. A pair of spaced, generally vertical internal walls 36 extend between the top and bottom portions of the peripheral side wall 30 within the hollow interior of case 12 to define a space therebetween for receiving day/night toggle actuator assembly 22. An opening 38 between the top side wall portion and back 28 of case 12 allows insertion of mirror support arm 24 and mounting bracket 26 therethrough when actuator assembly 22 is mounted. Preferably, mirror case 12 and retaining bezel 18 are injected molded from non-electrically conductive, resinous ABS plastic, such as that sold under the trademark TERLURAN KR2889, by BASF Company of Wyandotte, Michigan. Alternately, other resinous, melt processible plastics or moldable materials such as glass filled nylon and polypropylene could be used to form case 12. A suitable nylon is 13% glass modified nylon 6:6 sold as ZYTEL 71G13L by I.E. DuPont de Nemours & Company of Wilmington, Del., or PA123G13BK-47 by Bay Resins Inc. of Millington, Md.. A suitable polypropylene is TENITE P6M4Z-007 by Eastman Chemical Products, Inc., Kingsport, Tenn.

Preferably, reflective mirror element 14 is formed from soda time glass and has nonparallel front and rear surfaces, the rear surface preferably being coated with a highly reflective silver/chromium metal layer or other reflective surface. Alternately, clear plastic material such as polycarbonate or acrylic may be used to form prismatic mirror element 14. Scatterproofing/shatterproofing layer 16 is preferably formed from R101, a styrene butadiene rubber (SBR) polymer sold by Helmitin GmbH of Pirmasens, Germany, and is adhered to the rear surface to prevent scattering of glass fragments and shards in the event of glass breakage during an accident or the like. Alternately, an adhesive tape could also be used for layer 16.

Actuator assembly 22 is preferably of the type described in commonly-assigned U.S. Pat. No. 5,327,288 to Wellington et al. entitled "Reduced Vibration Day/Night Rearview Mirror Assembly," the disclosure of which is hereby incorporated by reference herein. As shown in FIGS. 1 and 2, actuator assembly 22 includes a toggle member 40 and a pivot lever 42, each preferably molded of a thermoplastic material such as 13% glass filled nylon. Toggle 40 includes a pivot journal 44 formed along its top edge, which journal corresponds to pivot axle 39 adjacent opening 38 at the upper rear of mirror case 12. Generally trapezoidal toggle 40 is preferably molded with a pattern of multiple voids defined by interconnecting, interior structural webs with a zinc die cast mounting ball 46 molded into and projecting outwardly from the back of toggle 40 in aperture 48 (FIG. 1). A generally rectangular aperture 50 extends through the entirety of toggle 40 adjacent its upper edge for receipt of an external power source connector plug 51, as described more fully hereinafter. A pivot tab or flange 52 extends downwardly from actuator 40 and engages the upwardly facing channel 54 on pivot lever 42 which is pivotally mounted between walls 36 within case 12 under actuator 40. Preferably, a spring bar is molded into the lower area of toggle 40 as is disclosed in U.S. Pat. No. 5,327,288. Thus, by pivoting lever 42 forwardly or rearwardly, mirror case 12 and thus reflective mirror element 14, carrier member 20 and bezel 18 are pivoted about axle 39 in journal 44 to change the position of mirror element 14 between a highly reflective day position in which light rays are reflected from the reflective rear surface of element 14 to the viewer, and a reduced reflectivity night position in which light rays from behind the vehicle are reflected from the front surface of mirror element 14.

The support arm 24 and mounting bracket 26 can be of any known variety including two ball pivot support arms, breakaway mounts adapted for mounting on the windshield button B as disclosed in commonly-assigned U.S. Pat. No. 5,327,288 to Wellington et al., or header mounted support arms as disclosed in co-pending, commonly-assigned, U.S. Pat. No. 5,615,857 to Richard R. Hook entitled "Mirror Support Bracket," the disclosures of which are hereby incorporated by reference herein. Alternately, toggle actuators other than assembly 22 could be substituted in mirror assembly 10 within the the concept of the present invention.

As is best shown in FIGS. 1 and 3–10, the integrated subassembly module or carrier member 20 preferably is a molded, thermoplastic, resinous support body 60 having a generally rectangular shape with its length greater than its height and a thickness preferably within the range of 0.08 to 0.25 inches, and more preferably of 0.08 to 0.15 inches. A stamped, metallic wire or other separately formed circuit member 62 (FIG. 4) is preferably insert molded within the carrier member support body 60 such that the circuit member is at least partially encased and/or encapsulated therein with selected electrical contacts projecting from the support body.

As is best seen in FIG. 4, the preferred form of the preformed circuit member 62 is stamped from metal such as brass or UNS-C26000 ¾ hard brass having a thickness of about 0.025 inches to include a series of bus strips 64 which extend and distribute electricity to bulb holders 66 and electrical switches 68 from external electrical connections 70. Alternately, rigid or flexible metallic wire could also be used. Thus, bus member 64a extends from electrical plug connection 70a to switch contacts 68b, 68c forming one side of the electrical connection for each of two separate switches 72a, 72b. A separate bus strip 64b extends from electrical connection 70b to bulb holder 66a and 66d which form one side of each of two sets of clip-type, bulb holders or receptacles 66. A third bus strip 64c extends between bulb holder 66b and connection 68a for switch 72a, while a fourth bus strip 64d extends from bulb holder 66c to electrical connection 68d for another electrical switch 72b.

Electricity from plug connections 70a, 70b is directed through switches 72a, 72b selectively to bulb holder sets 66a, 66b or 66c, 66d holding separate lamps or light bulbs 130. In a preferred form, circuit member 62 is formed with integral punch out or knock out plugs 74a, b, c and d which are removed following insert molding of the circuit member within support body 60 to form electrically isolated bus strips as described below.

As is best seen in FIGS. 1, 3 and 5, support body 60 is preferably molded to include spaced, square or rectangular apertures 80, 82 through which extend bus strips 64b, 64c and 64d generally at a right angle to the rear surface of support body 60. Bulb holders 66a, 66b and 66c, 66d are thus spaced outwardly from the rear surface of the support body on those bus strips and open downwardly for receipt of suitable wedge-base light bulbs 130 which may optionally be gas filled for longer life and preferably have a luminous intensity less than or equal to four (4) candlepower, and more preferably less than or equal to three (3) candlepower. Centered beneath each aperture 80, 82 is an elongated, vertically extending slot 84, 86, respectively, adapted to receive and mount reflectors 110, 112 therein as described below. Spaced inwardly from each slot 84, 86 is a rectangular recess or pocket 88, 90, respectively, adapted to slidingly receive switches 72b, 72a, respectively, from the bottom opening thereof. Each recess 88, 90 includes a forwardly projecting wall 89, 91 on the front side of support body 60, which walls each include a slot contoured to receive the projecting plunger from switch 72a, 72b. A rectangular plug receptacle 92 is molded at the top center of support body 60 for receipt of an external power source connector plug 51 (FIGS. 1 and 2) through opening 50 of toggle member 40 in actuator assembly 22 as described above.

Preferably, carrier member 20 is an insert molded assembly with circuit member 62 preformed and inserted within a suitable mold cavity and support body 60 molded therearound to partially encase and/or encapsulate the circuit member within the support body such that the various electrical connections, plugs and bulb holders project from the support body. The preferred material for the support body of carrier member 20 is a melt processible, thermoplastic material such as nylon preferably a glass and/or mineral filled nylon such as 30% glass filled nylon, or PBT 33% glass filled nylon such as CELANEX 3300 available from Hoechst Celanese Company of Somerville, N.J., while the preferred process is injection molding. Alternately, compression molding, extrusion molding, reaction injection urethane molding or casting of the support body about the circuit member 62 can be used. Thus, carrier member 20 is preferably integrally molded to include an electrical current carrying conductor 62 capable of carrying electricity of greater than one (1) amp such that the electricity is conducted and distributed from a connection to an external electrical source to the various electrical components on member 20 such as lamps, switches, controls, instruments, or the like. It is also possible to premold the support body in two halves such that the halves include a cavity therebetween and place the circuit member 62 between the two halves and secure them together such as by snap-fitting, ultrasonic welding or the like. As another alternative, the molded support body can be preformed to include channels or receptacles for the circuit member 62 with the preformed circuit member being secured to at least one surface of the support body such as in snap-in fashion. In such case, just as in the above molding method, at least a portion of the circuit member would be held by portions of the support body and project therefrom. The molding of carrier member 20 can also incorporate a receptacle for connection or plugging in of a PC circuit board for various alternative functions within the vehicle after mounting of the mirror assembly, as is explained below in connection with assembly 270.

After molding or other formation of carrier member 20, punch out or knock out areas 94, 96, 98 and 100 (FIGS. 1, 3 and 5) are pierced or moved out of the support body and circuit member to delete the punch outs or knock outs 74a, 74b, 74c and 74d thereby completely separating and electrically insulating the bus strips 64a, 64b, 64c and 64d from one another. This prevents electrical shorting within the circuit member. The resinous, thermoplastic material preferably used for the support body 60 is also non-electrically conductive and forms an insulating barrier between the bus strips to prevent electrical shorting.

Figure 7:
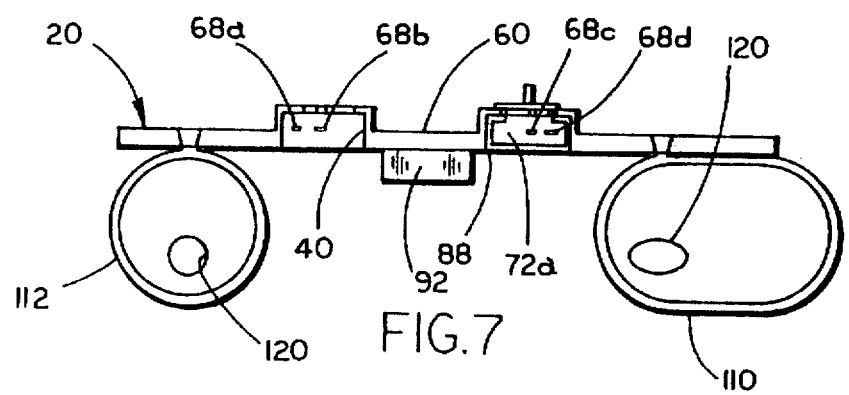
FIG. 7 is a bottom plan view of the carrier member assembly shown in FIG. 5.
Figure 10:
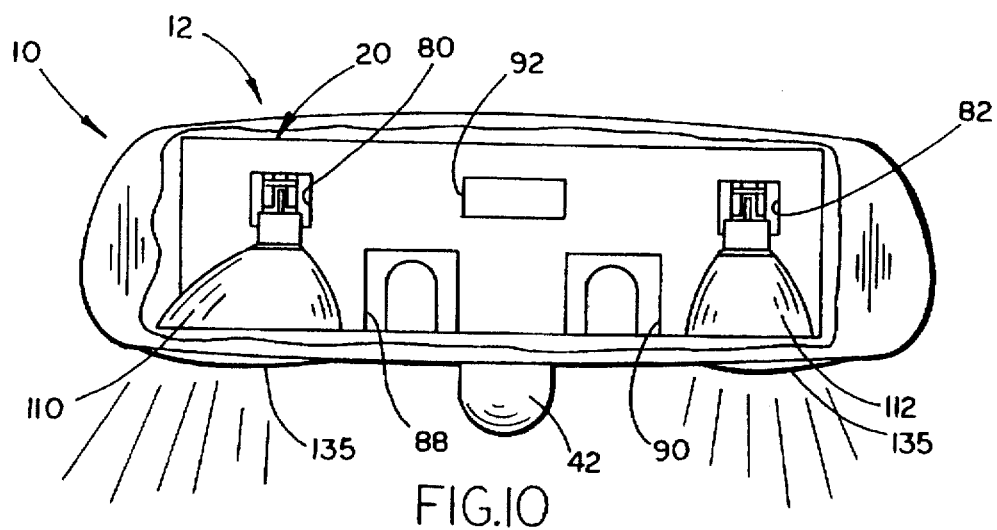
FIG. 10 is a rear elevation of the mirror assembly of FIGS. 1 and 2 broken away to show the carrier member assembly within the mirror housing/case and illustrating illumination from the lamp assemblies on the carrier member.
Figure 11:
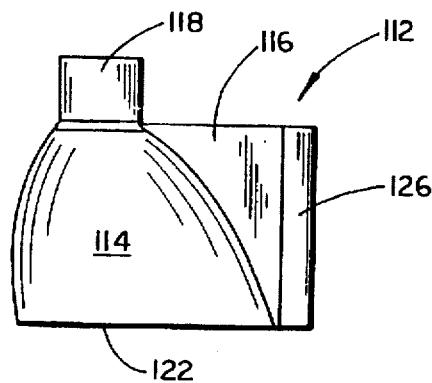
FIG. 11 is a side elevation of a reflector for use with the carrier member of FIG. 3.
Figure 12:
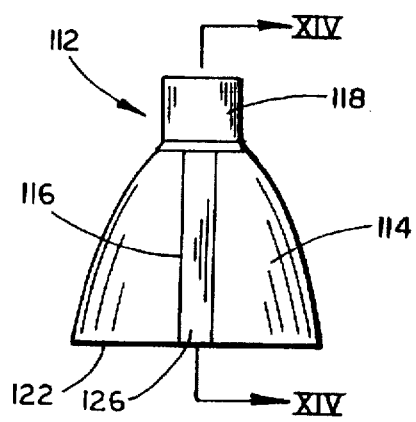
FIG. 12 is an end elevation of the reflector of FIG. 11.
Figure 13:
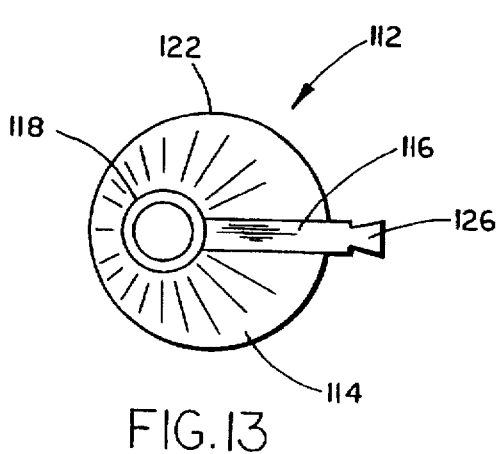
FIG. 13 is a top plan view of the reflector of FIGS. 11 and 12.
Figure 14:
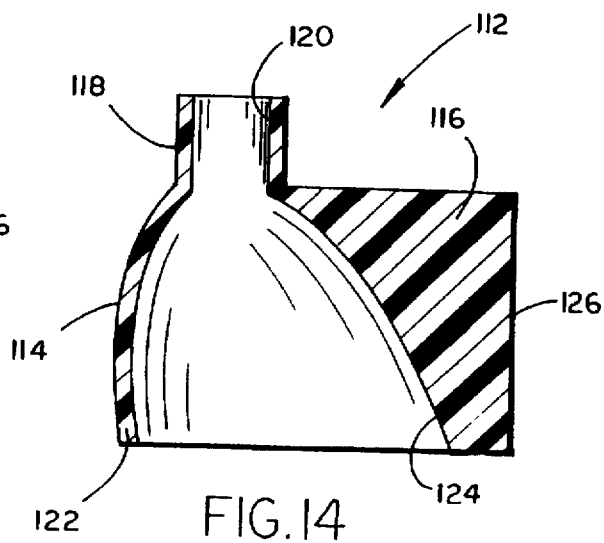
FIG. 14 is a sectional side view of the reflector taken along plane XIV—XIV of FIG. 12.

Referring now to FIGS. 1, 5 and 7–14, reflectors 110, 112 are adapted for removable mounting on circuit member 20. Preferably, reflectors 110, 112 are molded from a high temperature resistant (i.e., greater than 100° C. preferred), thermoplastic, melt processible resinous plastic material, preferably polycarbonate, although acrylic may also be used. Each reflector is substantially similar although including a slightly different shape depending on the area of the vehicle intended to be illuminated. For reference purposes, reflector 112 is described as shown in FIGS. 11–14, although it should be understood that reflector 110 includes substantially the same elements. Reflector 112 includes a curved, hollow, bulbous reflector body 114 having an integral mounting flange 116 projecting to one side thereof and a bulb receiving tube 118 projecting upwardly and defining a bulb receiving aperture 120. The lower periphery 122 of the molded reflector lies in a plane and defines a generally circular profile for reflector 112 although other shapes/profiles may also be used such as a generally elliptical profile for reflector 110 as shown in FIG. 7. Reflector 110 is somewhat more elongated utilizing that generally elliptical profile to direct light both downwardly and to one side of the mirror assembly when mounted in a vehicle so as to properly illuminate the lap or seat area of the passenger side of the front seat of a vehicle, while reflector 112 directs light downwardly and toward the driver lap or seat area of the vehicle front seat as shown in FIG. 10. The inside surface 124 of the reflector body 114 is preferably vacuum metalized to provide a highly specular, shiny reflective surface efficiently directing light rays downwardly and in the intended direction from bulb 130 when received in aperture 120.

As is best seen in FIGS. 5, 7 and 11–13, the vertically extending edge 126 of mounting flange 116 is inwardly tapered to mate with a correspondingly tapered slot 84 or 86 (FIG. 7) when edge 126 is slidably inserted at the bottom of slot 84 or 86. The taper of the slot and molded edge forms a dovetail joint which prevents removal of the reflector from the carrier member in a direction perpendicular to the plane of the carrier member while maintaining flange 116 generally perpendicular to the plane of member 20. In addition, slots 84, 86 are generally aligned with bulb holders 66 at either end of carrier member 20 such that when wedge-base light bulbs 130 are inserted in the bulb holders, and project downwardly therefrom as shown in FIGS. 1, 5, 8 and 9, the sliding of the reflectors 110, 112 into slots 84, 86 causes light bulbs 130 to be telescopingly inserted in apertures 120 of tubes 118 such that the bulbs extend through these apertures and at least partially into the bulbous, hollow, reflector body 114 adjacent reflectorized surface 124. The bulb filament is, therefore, located within the hollow area defined by the reflectorized surface to properly direct light rays downwardly and toward the driver's seat area. The same is true of reflector 112 which directs light downwardly and toward the lap or seat area for the front seat passenger of the vehicle from the position of the rearview mirror assembly when secured to the center portion of the windshield above the instrument panel area.

Figure 15:
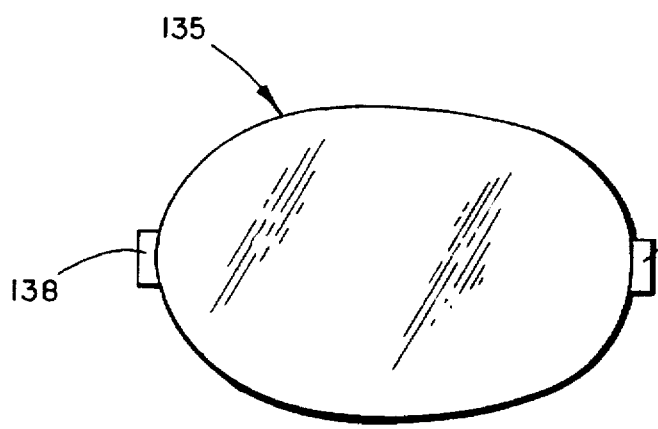
FIG. 15 is a bottom plan view of a lens element for use in the present invention.
Figure 16:
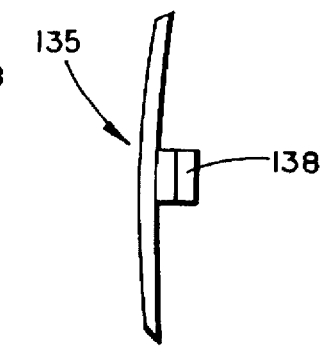
FIG. 16 is an end elevation of the lens of FIG. 15.
Figure 17:
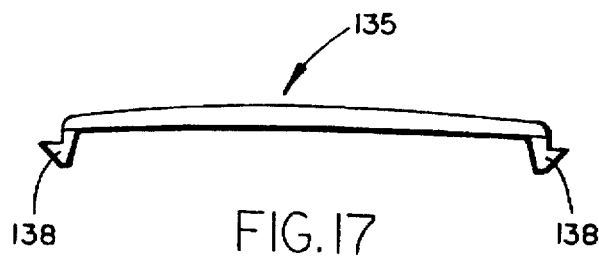
FIG. 17 is a side elevation of the lens of FIG. 15.

As shown in FIGS. 1, 10 and 15–17, the final elements of mirror assembly 10 include lens elements 135 which are substantially similar to one another on either end of the assembly. Each lens element 135 is a slightly curved molded plastic body having the general shape of an ellipse, as is best seen in FIG. 15. Preferably, the lens elements are formed from an acrylic or polycarbonate material which is adapted to be scattering (such as by forming a stippled, scattering surface during molding of the lens element itself by providing a stippled surface in the mold cavity) to provide a diffused, translucent appearance. Thus, in assembly 10, neither lens is used as a focusing element, but rather provides diffused light to illuminate a wide area in the driver or passenger seat area. Alternately, lens 135 can be a diffuse optic, a clear optic, a holographic optic, a Fresnel optic, a binary optic, a sinusoidal optic, a diffractive optic or a tinted optic element as desired. Preferably, lens elements 135 are retained in elliptical lens openings 136 at either end of mirror case 12 (FIG. 1) by tapered, retaining prongs 138, one prong at either end of each lens element.

As will also be understood, reflectors 110, 112 can also be manufactured for adjustment once mounted on the carrier member 20. Mounting flange 116 could thus be pivotally or swivelly mounted to reflector body 114 so as to allow adjustment of the position of the reflector and thus the direction of the light emanating from the bulb 130 inside each reflector when adjusted. As shown in the embodiment of mirror assembly 10, however, reflectors 110, 112 are positioned in specific, fixed positions on the carrier member at specific angles to direct light in a specific direction for a predetermined vehicle. Alternately, other lenses which are clear and have light focusing or directing surfaces thereon could be used to further direct the light emanating from the reflector housings through case openings 136 so that predetermined areas of the vehicle can be illuminated.

Figures 8, 9:
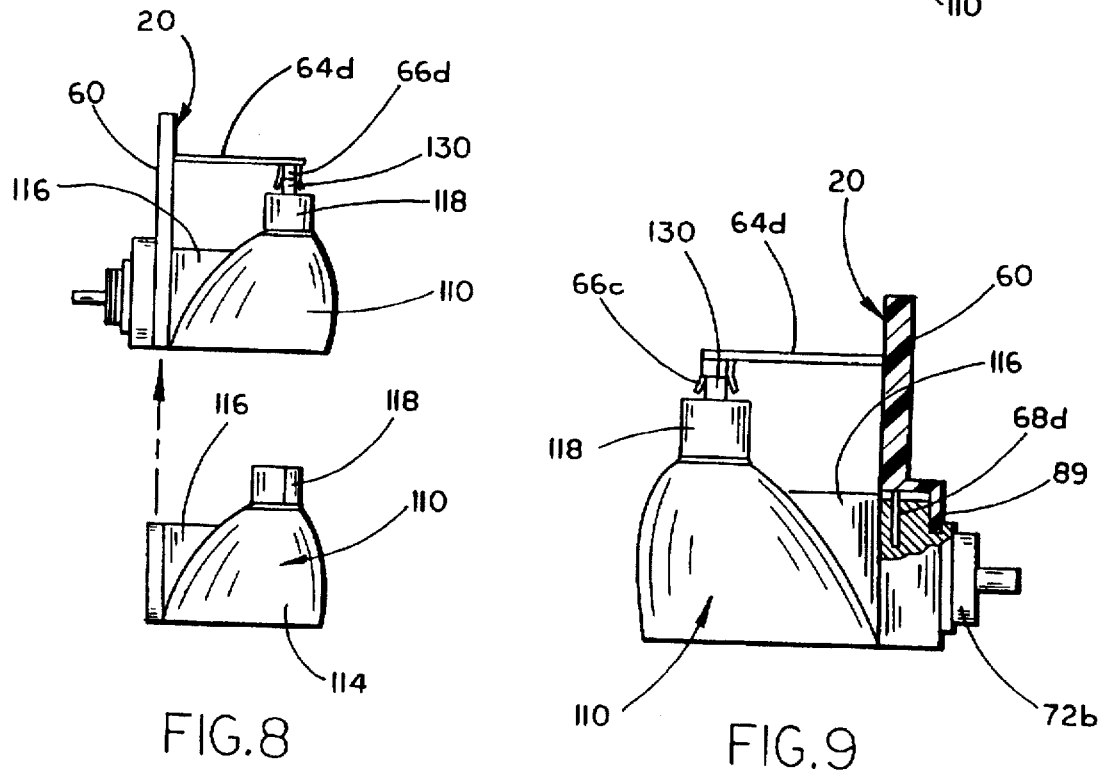
FIG. 8 is an end elevation of the carrier member assembly showing a method for attachment of a reflector to the carrier member.
FIG. 9 is a sectional end elevation of the carrier member assembly taken along plane IX—IX of FIG. 6.

As will now be understood, assembly of the modular rearview mirror assembly 10 will be apparent. A preassembled toggle actuator assembly 12 is inserted within the previously molded mirror case 12 by inserting bracket 26 through opening 38 from the interior of the case toward the rear of the case. Toggle actuator 40 is then slid into position such that pivot axle 39 engages journal 44. Pivot tab 52 is engaged with channel 54 of pivot lever 42 during insertion of toggle actuator 40 such that it is properly retained in position. Next, carrier member 20 is preassembled with the light bulbs 130, reflectors 110, 112, electrical switches 72 or other electrical components thereon. More specifically, electrical switches 72a, 72b are slid into recesses 88, 90 such that electrical connections 68a, 68b and 68c, 68d are plugged into corresponding receptacles in the switches as shown in FIG. 4. Next, wedge-base light bulbs 130 are inserted in bulb holders 66a, 66b and 66c, 66d. Thereafter, reflectors 110, 112 are each slid over bulbs 130 by engaging tapered flange 126 with slot 84 or 86 and moving the reflector upwardly into position over the bulb as shown in FIG. 8.

Following preparation of the modular integrated subassembly of carrier member 20, that subassembly is inserted by placing the carrier assembly into the interior of mirror case 12 with plug receptacle 92 extending into and/or aligned with aperture 50 of toggle actuator 40. The carrier member is received with the bottom periphery 122 of each reflector housing immediately adjacent the periphery of opening 136 such that periphery 122 is abutted against the inside surface of the peripheral side wall of the mirror case adjacent the opening 136. This is accomplished by dropping the lower edge of the carrier member 20 into the space between retaining rib 140 spaced outwardly of the front edge surfaces of walls 36 on the interior bottom portion of case wall 30 (FIGS. 1 and 2), followed by rotating the top edge in toward the actuator 40 until it is properly positioned with the reflectors and light bulbs in alignment with openings 136, and abutted against the exposed edge surfaces of walls 36. In this position, ribs 142a, 142b on the rear surface of carrier member 20 engage the outside surfaces of walls 36 to restrain lateral movement of carrier member 20 within the case.

Subsequently, reflective mirror element 14 is similarly placed in the interior of case 12 within the perimeter of peripheral side wall 30 followed by inserting and securing retaining bezel 18 either by snap-fit clips 19 or ultrasonic welding. As shown in FIG. 2, the rear of polymeric layer 16 resiliently engages the upper front surface of carrier member 20 to hold the carrier member and prevent vibration thereof. Once rearview mirror assembly 10 is mounted in the vehicle as shown in FIG. 2, a plug connector 51 from the vehicle power source can be inserted through opening 50 in actuator 40 and engaged with the electrical connectors 70a, 70b in plug connection 92 at the rear of the carrier member to provide external power to the carrier member and electrical components such as light bulbs 130 thereon. When assembled in this fashion, the plungers of switches 72a, 72b extend through the lower portion of bezel 118 and specifically apertures 21a, 21b through which push buttons 73a, 73b extend for operation of the switches and thus the light bulbs electrically connected thereto.

When installed in this manner in a rearview mirror case or housing, carrier member 20 provides a support, positioning element and electrical distribution network for electrical components such as light bulbs 130 and electrical switches 32. However, the carrier member also provides a strengthening member serving as a reinforcement or buffer between toggle assembly 22 and reflective mirror element 14 to retain the toggle assembly in place in the event of impact due to inflation of supplemental occupant restraint systems, also known as airbags, within vehicles as is explained in co-pending, commonly-assigned U.S. patent application Ser. No. 08/273,491, filed Jul. 11, 1994, now U.S. Pat. No. 5,521,760 by Harold W. DeYoung et al., now U.S. Pat. No. 5,521,760, the disclosure of which is hereby incorporated by reference herein.

With reference to FIGS. 18–21, a second embodiment 150 of the modular rearview mirror assembly for vehicles of the present invention is shown. Mirror assembly 150 incorporates a modified mirror case or housing 12' which is substantially similar to mirror case 12 except for being preferably molded from polypropylene, or alternately from polypropylene/polyethylene copolymer, and having the peripheral edge 32' of peripheral side wall 30' formed with lip 32'. Instead of using a two-piece mirror case including a retaining bezel as in embodiment 10, mirror case 12' incorporates a molded lip on peripheral edge 32' (FIG. 19) which allows snap-in insertion of reflective mirror element 14' immediately following molding of case 12' and when peripheral side wall 30' is still warm and relatively flexible. Specifically, prismatic mirror element 14' has a periphery which is slightly larger than the front opening to the mirror case defined by lip 32' as shown in FIG. 19. While mirror case 12' is still warm and relatively flexible, mirror element 14' can be snapped past the lip 32' into the position shown in FIG. 19 such that when mirror case 12' completes its cooling, the mirror case shrinks around the periphery of mirror element 14' to secure it in position and prevent rattling and vibration during use. In addition, mirror case 12' includes switch access openings 152a, 152b on either side of the toggle actuator assembly adapted to register with switches on the carrier member 20' when assembled within case 12'.

The preferred polypropylene material of one-piece case 12' has a lower heat deflection temperature, lower material cost, and higher material shrinkage rate than the preferred ABS or glass-modified nylon materials used for two-piece housing 12 described above. In spite of its lower heat deflection temperature, degradation of the one-piece polypropylene case from heat generated by the lamps in the assembly is obviated due to the efficiency of the highly reflective reflectors 110', 112' and overall efficient heat management within the assembly. As an aid to heat dissipation from the assembly, air ventilation passageways extending through case 12' and past and around the lamps and reflectors in the assembly can optionally be used as disclosed in commonly-assigned U.S. Pat. No. 5,178,448, the disclosure of which is hereby incorporated by reference herein.

For example, the heat deflection temperatures, determined under ASTM Standard D 648-88, of the preferred materials for cases 12 and 12' are:

|  | @ 264 psi | @ 66 psi |
| --- | --- | --- |
| ZYTEL 71G13L Glass-Modified Nylon | 446° F. | 491° F. |
| TERLURAN KR2889 ABS | 223° F. | 234° F. |
| TENITE P6M4Z-007 Polypropylene | 125° F. | 181° F. |

Likewise, the mold shrinkage rate for the preferred materials for cases 12 and 12' are:

| ZYTEL 71G13L Glass-Modified Nylon | .008–.014 inch/inch |
| --- | --- |
| ABS Polymer | .003–.004 inch/inch |
| TENITE P6M4Z-007 Polypropylene | .010–.025 inch/inch |

Thus, it is preferred that the material shrinkage rate for the material of one-piece case 12' be greater than 0.010 inch/inch.

Figure 20:
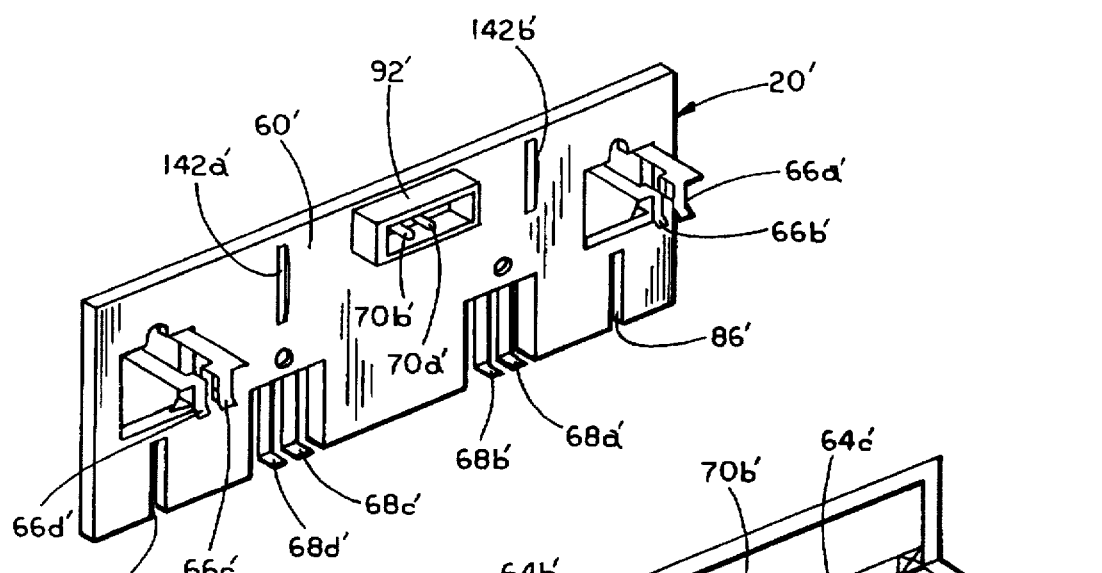
FIG. 20 is a perspective view of a preferred form of the carrier member for use in the mirror assembly of FIGS. 18 and 19.
Figure 21:
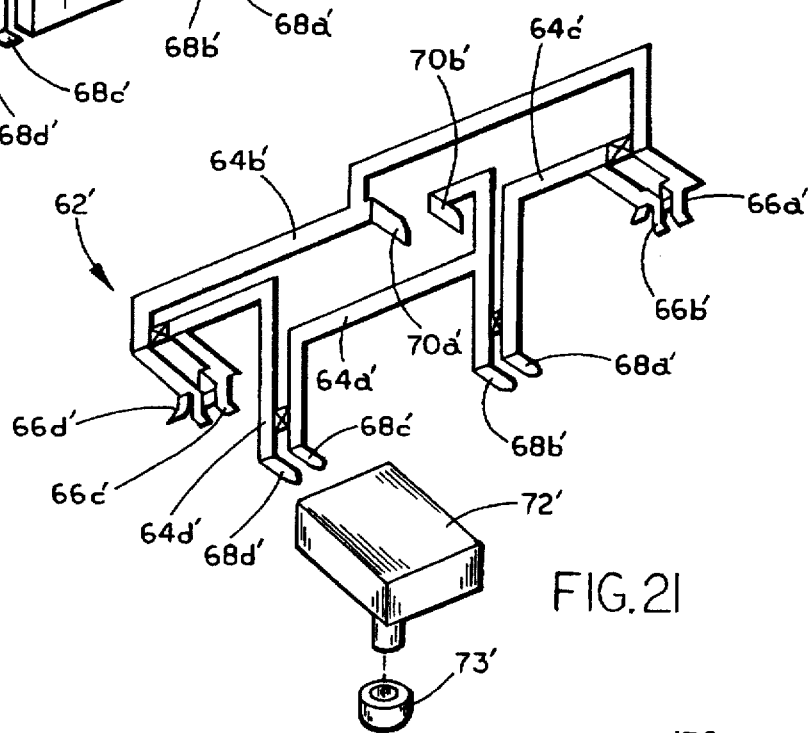
FIG. 21 is an exploded, perspective view of a metal stamping for inclusion in the carrier member of FIG. 20 also illustrating a preferred form of switch adapted to mate with the electrical circuit.

In addition to the above modified mirror case 12', mirror assembly 150 includes a modified circuit member 62' (FIG. 21) which is preferably insert molded in a support body 60' to form carrier member 20' in the same manner as described above for assembly 10. Like circuit member 62, circuit member 62' is preferably stamped from sheet metal such as brass or formed from metallic wire to include a plurality of bus strips providing electrical connections within the carrier member. Each of the bus strips is substantially similar to those in circuit member 62 except that the lower ends of bus strips 64a, 64c' and 64d' are modified such that tapered prongs or electrical connectors 68a', 68b', and 68c', 68d', extend at right angles to the remainder of the bus strip and in the same direction in which the bulb holders 66 and electrical connections 70 extend. As shown in FIG. 20, when circuit member 62' is insert molded or otherwise encapsulated at least partially within support body 60' of carrier member 20', prongs 68a', 68b' and 68c', 68d' extend into recesses 88', 90' such that electrical switches 72' can be inserted into those recesses and plugged into the electrical connections in a direction substantially perpendicular to the plane of carrier member 20'. This is different from the insertion of switches 72a, 72b which are inserted in a direction substantially parallel to the plane of carrier member 20 from the bottom of recesses 88, 90 as shown in FIGS. 3 and 4.

Accordingly, with reference to FIGS. 18 and 19, once carrier member 20' forming an integrated subassembly module is assembled with appropriate reflectors, light bulbs and switches in the aforementioned manner, such that the plungers of switches of 72' extend downwardly with switch buttons 73' mounted thereon, carrier member 20' may be inserted within mirror case 12' by placing the lower edge within the case between rib 140' and the front surfaces of walls 36' and rotating the top edge toward the toggle actuator assembly such that switch plungers pass through switch openings 152a, 152b. Carrier member 20' then abuts against the front edges of walls 36'. All of this occurs within a relatively few seconds after the case 12' has been removed from the mold where it is formed. During this time period, the preferred polypropylene or polypropylene/polyethylene copolymer material of case 12' is still warm and is preferably at a temperature of approximately 120° F. to 210° F., and more preferably 135° F. to 165° F. It takes but a few seconds to insert carrier member 20' in the above manner after which the prismatic reflective mirror element 14' may be mounted by snapping it past retaining lip 32' which is still in its warm and relatively flexible state as described above. The rear of polymeric layer 16' engages the top, front surface of carrier member 20' to hold it against the front edges of walls 36' and prevent rattling and/or vibration of the carrier member within case 12'. Thereafter, assembly 150 is allowed to cool such that the case 12' further shrinks tightly about the peripheral edge of carrier member 20' and reflective mirror element 14' to help hold them securely in place against vibration and rattling. Subsequently, lens elements 135' may be inserted in lens openings 136' to complete the assembly. An electrical connector is inserted to engage connections 70a', 70b' through aperture 50' of actuator 40' once the mirror is mounted in the manner described above.

With reference to FIGS. 22–29, a third embodiment 170 of the modular rearview mirror assembly of the present invention is illustrated. Mirror assembly 170 includes a hollow molded mirror case 172 preferably formed from polypropylene and including a formed lip 174 similar to that used in connection with mirror assembly 150 allowing snap-in insertion of a reflective prismatic mirror element 175 having a shatterproofing layer thereon (FIG. 23). Also included is a toggle actuator assembly 176 connected to a support arm and mirror bracket similar to that used in embodiments 10 and 150 except that toggle actuator assembly 176 is formed in one piece with pivot lever 178 joined by a living hinge 180 to a spring bar 182. In addition, toggle actuator 184 is pivotally mounted on axles 186 near the top of the rearview mirror assembly between vertical walls 177. In addition, there is no through aperture in the actuator assembly for receipt of an external power connection since the carrier member 190 used in assembly 170 includes its own receptacle for such a power connection.

Instead of a rectangular carrier member on which are mounted spaced lamps and reflectors for illumination from either end of the mirror assembly as in embodiments 10 and 150, and which is assembled prior to insertion of the reflective mirror element to close the mirror case, mirror assembly 170 includes a removable carrier member 190 which at least partially encapsulates a circuit member 192

Figure 22:
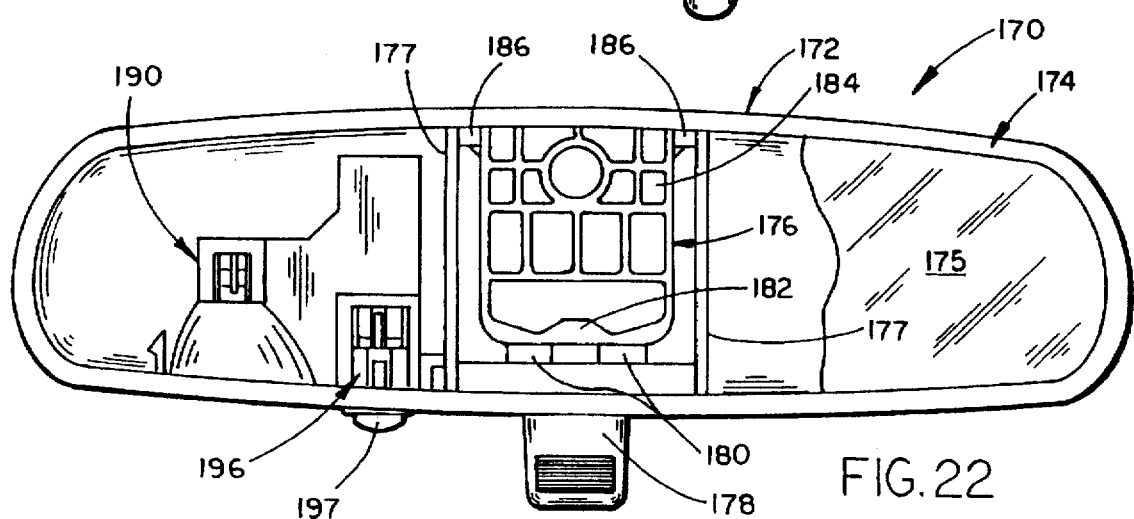
FIG. 22 is a front elevation of a third embodiment of the modular rearview mirror assembly of the present invention with a portion of the prismatic mirror element removed.
Figure 25:
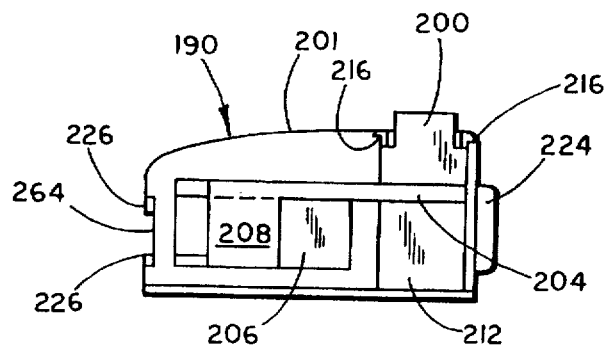
FIG. 25 is a top plan view of a preferred form of the carrier member adapted for use with the mirror assembly of FIGS. 22–24.
Figure 26:
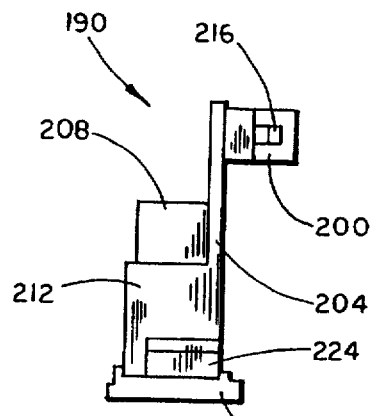
FIG. 26 is an end elevation of the carrier member of FIG. 25.
Figure 27:
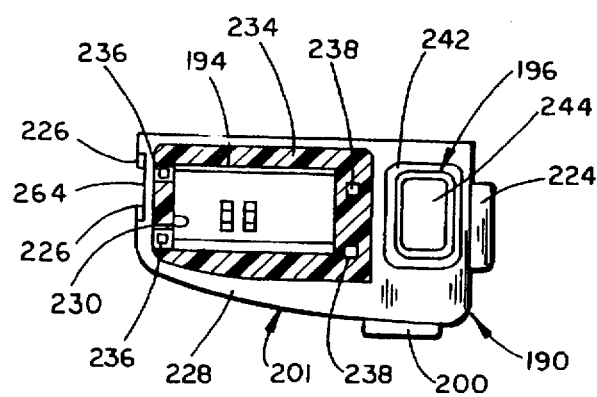
FIG. 27 is a bottom plan view of the carrier member of FIGS. 25 and 26.

(FIG. 28), a lamp or bulb 130, a stamped metallic reflector 194, a switch assembly 196, a lens element 198 and a plug receptacle 200 for receiving an external power connector. Carrier member 190 with these elements can be inserted and removed from mirror case 172 after mounting and assembly of mirror element 175 behind snap-in lip 174 to provide for servicing and repair of the lamp or light unit in the carrier member or for access to the interior of the mirror case for any other reason. As shown in FIG. 22, when mounted in the mirror assembly, the toggle operator 197 of switch 196 protrudes slightly below the peripheral side wall at the bottom of the mirror case for access and operation.

As is best seen in FIGS. 23–27, carrier member 190 includes a generally rigid body or support 201 preferably formed from polypropylene and having a generally trapezoidal shape when viewed from the top or bottom conforming to the shape of an opening 202 in the bottom wall of mirror case 172 (FIG. 23). Rigid body 201 includes an upstanding wall 204 on its top surface in which is molded and at least partially encapsulated circuit member 192 (FIG. 28) such that various electrical connections extend therefrom. Formed integrally with wall 204 is a hollow, bulbous reflector mount or receptacle 206 from which a bulb mounting socket 208 extends upwardly and includes a through aperture 210 into which extend bulb holders or connectors 252a, 252b from circuit member 192. At the opposite end of rigid body 201 is a switch receptacle 212 molded integrally with wall 204 and including a through aperture 214 into which extend electrical connectors 256a, 256b from circuit member 192. On the rear side of wall 204 is molded integrally a plug connector 200 forming a rectangular receptacle for receiving an external power connector into which extend electrical connections 254a, 254b from circuit member 192. Integrally molded with plug connection 200 are resilient prongs or barbed fingers 216 adapted to engage the inside surface of an internal wall or rib 218 which outlines an aperture 220 through the rear wall 179 of mirror case 172. In addition, rigid body 201 also includes an upstanding peripheral wall 222 (FIGS. 24 and 25) extending around the edge of the body, an upstanding, substantially rigid L-shaped flange 224 at one end, and a pair of resilient prongs or retaining fingers 226 at the opposite end. The bottom surface 228 of rigid body 201 defines a pair of spaced openings 230, 232, and a recess area 234 surrounding opening 230. Recess 234 is matched to the configuration and outline of lens element 198 and includes two spaced pair of openings 236, 238 adapted to receive barbed securing fingers or prongs 240 on the upper surface of lens element 198. Lens element 198 may thus be removably inserted in recess 234 such that it is flush with surface 228 to cover opening 230 and close the chamber inside reflector 194 as will be more fully described below. Likewise, opening 232 receives switch assembly 196 therethrough from the bottom such that rim 242 on switch 196 engages bottom surface 228 of rigid body 201 adjacent opening 232 (FIG. 23). Toggle 244 for switch 196 is thus accessible from the bottom surface of the mirror and carrier member 190. Lens element 198 is preferably formed from an acrylic or polycarbonate, molded material and may be either clear or cloudy/translucent to provide focused light in which case various lens surfaces will be provided on the lens element or diffuse light for illumination of a general area within the vehicle.

Figure 28:
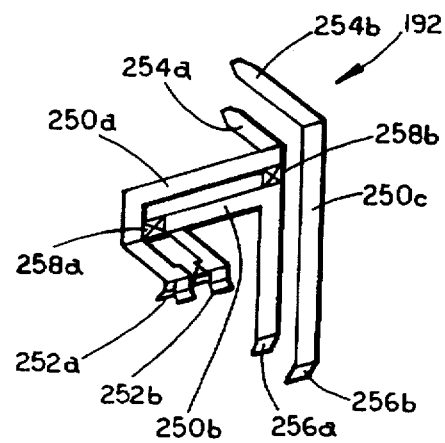
FIG. 28 is a perspective view of a stamped metal electrical circuit adapted for incorporation in the carrier member shown in FIGS. 25–27.
Figure 29:
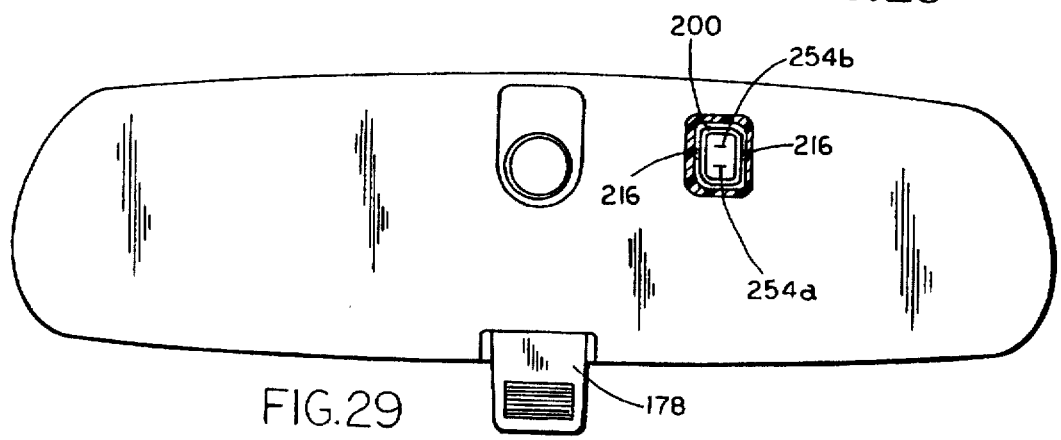
FIG. 29 is a rear elevation of the mirror assembly of FIGS. 22–24.

As shown in FIG. 28, circuit member 192 is preferably stamped from thin brass or other suitable metal and includes three bus strips 250a, 250b, and 250c. Bus strip 250a extends from clip-type bulb holder 252a to plug connector 254a at its opposite end. Bus strip 250b extends from clip-type bulb holder 252b to switch engaging electrical connection 256a at its opposite end. Bus strip 250c extends from switch engaging electrical connection 256b at one end to plug connection 254b at its opposite end. Preferably, the brass circuit stamping is formed with punch out or knock out portions 258a and 258b between bus strips 250a and 250b and a separate brass stamping bus strip 250c. These members are placed in a suitable mold cavity and carrier member 190 is preferably injection molded therearound to form an integral molding which at least partially encapsulates the circuit member 192 therein such that bulb holders 252, and electrical connections 254, 256 extend therefrom in the indicated apertures for connection to the various electrical components. Of course, as explained above in connection with carrier member 20, other molding methods may be used such as compression molding, extrusion molding, reaction injection molding for urethane or casting.

As is best seen in FIG. 24, reflector 194 is preferably stamped from aluminum, has the shape of a compound or double parabola, and is highly polished on its inside surface 260 for high and specular reflection of light from light bulb 130. Alternately, the reflector shape can be molded in wall 204 and have its inside surface vacuum metalized just as with reflectors 110, 112 to provide high, specular reflection. Reflector 194 also includes an upper opening 262 through which the light bulb 130 extends when mounted in bulb holders 252a, 252b, as shown in FIG. 23. The shape of the hollow body portion of reflector 194 is parabolic on each side of lamp 130. As shown in FIG. 23, the specific shape is that of a double or compound parabola designed to collect light and direct it both to the driver and front seat passenger lap areas. Reflector 194 is adapted to correspond to the internal surface of the reflector receptacle 206 molded integrally with carrier member 190 as described above.

Accordingly, assembly of mirror assembly 170 will now be apparent. Carrier member or integrated subassembly module 190 is first assembled by placing reflector 194 within receptacle 206 from the bottom surface 228 of body 201 of the carrier member. Thereafter, a wedge base light 130 is inserted through the bottom opening of the reflector 194 into the bulb holders 252a, 252b such that the bulb extends through reflector opening 262, as shown in FIG. 23. Thereafter, lens element 198 is inserted by engaging prongs or fingers 240 in apertures 236, 238. Finally, switch assembly 196 is inserted through opening 232 such that its electrical contacts engage contacts 256a, 256b of circuit member 192.

With the carrier member subassembly completed in the above manner, that assembly is inserted through bottom opening 202 in the mirror 172 such that wall 204 extends upwardly and plug receptacle 200 is aligned with opening 220 in the rear wall of mirror case 172. Prongs or fingers 216 are then engaged with the inside surface of rib or wall 218 on the rear inside of case 172 to engage the plug receptacle within opening 220 and prevent it from being pushed into the interior of the case when an external plug connector is engaged. Simultaneously, flange 224 is engaged over a wall adjacent opening 220 while resilient prongs 226 flex and engage the inner surface of the bottom wall of the mirror case 172 at the opposite end of the carrier member to complete assembly. Should removal be desired, a tool such as a screw driver can be inserted through slot 264 adjacent resilient fingers 226 to flex the fingers and allow pivotal removal of carrier member 190 from opening 202 after disengagement of the plug receptacle 200 and ribs 216 from the rib 218 toward the top of the case.

Figure 31:
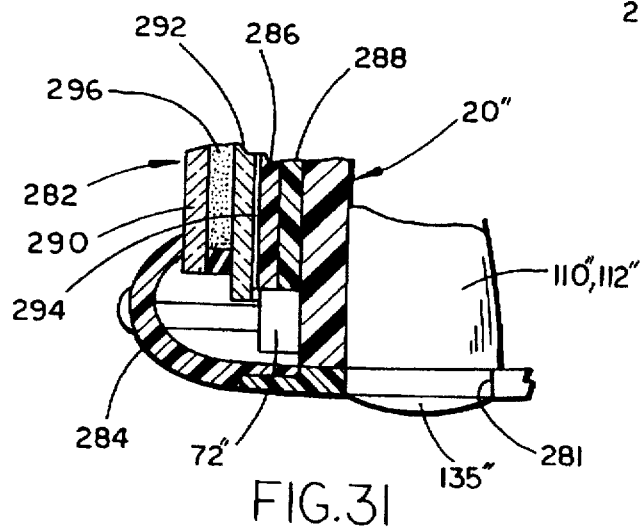
FIG. 31 is an enlarged, fragmentary, sectional view of area XXXI of FIG. 31.
Figure 30:
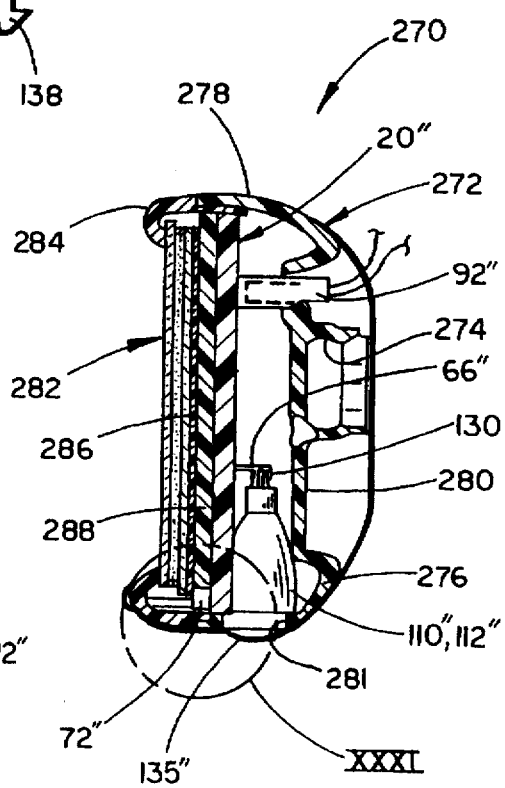
FIG. 30 is a sectional end elevation of a fourth embodiment of the modular review mirror.

Referring now to FIGS. 30 and 31, a fourth embodiment 270 of a modular interior rearview mirror assembly incorporating the present invention is shown. Assembly 270 is of the type described in published European Patent Application No. 0 615 882 A2, filed Mar. 18, 1994, the disclosure of which is hereby incorporated by reference herein. The assembly includes a mirror case 272 which, like mirror cases 12, 12' and 172 above, is preferably molded from a resinous, thermoplastic or thermoset plastic which may be reinforced with fibers, adapted for mounting on a vehicle windshield by means of an adjustable mirror support. Instead of a ball member extending outwardly from its rear side, mirror case 272 includes a socket 274 for receiving a ball member extending outwardly from the mirror support, and has a rear wall 276, and a peripheral wall 278 having top, bottom and end portions. Socket 274 is formed in a recess 280 in the rear wall of the case, as shown in FIG. 30. The mirror case also includes a plurality of support flanges integrally formed on the interior surface of the mirror case 272 to support a variable reflectance, electro-optic mirror cell 282 more fully described below. A forward facing light sensor (not shown) extends through rear wall 280 while a second light sensor (not shown) faces rearwardly. Electrooptic, reflective mirror cell 282, which preferably is an electrochromic cell either of the solid-state type or the electrochemichromic type, is mounted in the rearwardly facing opening of mirror case 272 and held therein by a peripheral bezel 284 as shown in FIGS. 30 and 31. A layer of foam material 286 is adhered to the rear surface of mirror cell 282 and covers substantially the entire rear surface of the cell except where items such as through-the-cell photodetectors and information displays, such as compass displays, are mounted behind the mirror. Foam layer 286, such as a cross-linked polyethylene foam, acts as a resilient shock absorber to reduce the risk of breaking the mirror element during an impact, and includes an adhesive layer applied to both its front and rear surfaces. One adhesive surface of the foam is adhered to the rear surface of mirror cell 282. The second adhesive surface provides an attachment for a printed circuit board 288 mounted thereon. The rear surface of circuit board 288 which faces away from mirror cell 282 carries various electrical components of an electrical circuit used to control operation of the electro-optic mirror cell such as a circuit, for example, like that described in commonly-assigned U.S. Pat. No. 4,886,960, the disclosure of which is hereby incorporated by reference herein. Printed circuit board 288 also includes a two-position electrical switch (not shown) for on/off control of the electrooptic circuit.

Preferably, variable reflectance, electro-optic reflective mirror cell 282 is an electrochromic mirror cell that includes a transparent, front glass sheet 290 and a transparent, rear glass sheet 292 having a reflective coating 294 applied to its rear surface. Front glass 290 and reflective rear glass 292 are slightly offset relative to one another such that the upper and lower edges project for connection to appropriate metal connection strips (not shown). A variable light transmittance, electrochromic medium 296 is sandwiched in the space between the front glass 290 and rear glass 292. The front surface of rear glass 292 and rear surface of front glass 290 each have a transparent electroconductive coating, such as indium tin oxide or doped tin oxide or the like, to conduct electricity across the full contact extent of electrochromic medium 296 from the connection strips secured at the offset top and bottom of the front and rear glass sheets. When controlled by printed circuit 288, electrical voltage is applied across electro-optic cell 282 between front glass 290 and rear glass 292 causing a variation in the transmittance of layer 296 such as darkening or opacity to reduce the light reflected by the reflective rear glass 292. Electrochromic medium 296 may, for example, be an electrochemichromic medium such as is described in commonly-assigned U.S. Pat. Nos. 5,140,455 and 5,151,816 or a solid-state electrochromic medium such as described in the following publications: N. R. Lynam, "Electrochromic Automotive Day/Night Mirrors", *SAE Technical Paper Series*, 870636 (1987); N. R. Lynam, "Smart Windows for Automobiles", *SAE Technical Paper Series*, 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Washington (1990), the disclosures of which are each hereby incorporated by reference herein.

Supported to the rear of circuit board 288 is an integrated subassembly module or carrier member 20" similar to that used in assembly 10 above. Carrier member 20" is also a molded, thermoplastic, resinous support body incorporating an integrally molded, preformed circuit member, pairs of bulb holders 66", a pair of lamps or light bulbs 130 and a pair of reflectors 110", 112", all of which are substantially similar to those on carrier member 20, formed and/or secured thereto as in carrier members 20, 20'. Reflectors 110" are positioned to direct light through opening 281 in the case bottom and lens 135". Carrier member 20" also preferably includes a pair of electrical switches 72" projecting through bezel 284 for access and operation from the front in a manner similar to switches 72 on carrier member 20 in assembly 10. Carrier member 20" further includes a plug receptacle 92" on its rear surface and aligned with an opening in case wall 280 for receiving a plug extending from the vehicle electrical system. Suitable electrical connections from carrier member 20" to circuit board 288 are also included.

Assembly of mirror assembly 270 is similar to that for assembly 10 above. After molding of case 272, previously prepared subassembly carrier member 20" is placed within the case interior. Next electro-optic mirror cell 282 with foam layer 286 and circuit board 288 are placed as a unit within case 272 while making suitable electrical connection between circuit board 288 and carrier member 20". Bezel 284 is secured by snap-fit clips or ultrasonic welding to retain the components within the case as in assembly 10 with the electrical switches from carrier member 20" extending through bezel 284 for access and operation of lamps 130 as in assembly 10. Lenses 135" are then fitted over openings 281. Thus, the carrier member subassembly of the present invention is useful with either manual day/night rearview mirrors, or rearview mirrors incorporating electrochromic or other electro-optic reflective elements.

It is also possible to incorporate low level console or instrumentation lighting for vehicles in assemblies 10, 150, 170 or 270 by fitting a low level, non-incandescent, light emitting light source such as a light emitting diode on any of carrier members 20, 20', 190 or 20" for illumination through openings in cases, 12, 12', 172 or 272 as disclosed in copending, commonly-assigned U.S. patent application Ser. No. 08/367,844, filed Dec. 30, 1994, by Brent J. Bos et al., the disclosure of which is hereby incorporated by reference herein.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by claims which follow.

The embodiments of the invention in which an exclusive property or privilege is claimed are as follows:

1. A rearview mirror assembly for vehicles comprising:
   a case having a reflective mirror element, said case including at least one opening therethrough;
   a support on said assembly for mounting said assembly on a vehicle;
   a modular carrier member formed separately from and mounted to said case, said carrier member including an electrically conductive circuit member and a non-electrically conducting support body, said circuit member being formed separately from and secured to said support body, said circuit member including a plurality of bus strips, said bus strips supported by and separated and electrically insulated from one another by said support body, said carrier member providing an integral support, electrical connections for, and an electrical distribution network to at least one lamp on said assembly; and
   a lamp mounted on said carrier member, connected to said circuit member, and adapted to provide light through said case opening to a portion of the vehicle when said mirror assembly is mounted thereon.

2. The mirror assembly of claim 1 including an electrical switch mounted on said carrier member and connected to said circuit member for controlling operation of said lamp.

3. The mirror assembly of claim 2 wherein said circuit member includes at least one set of electrical connectors extending from said support body for engaging said switch; said switch mounted in alignment with said set of electrical connectors and electrically connected thereto.

4. The mirror assembly of claim 2 wherein said case has an exterior surface; said switch mounted to be accessible for operation of said lamp at said exterior surface of said case.

5. The mirror assembly of claim 4 wherein said case includes a front surface and a bottom surface; said switch being mounted for access at one of said front and bottom surfaces of said case.

6. The mirror assembly of claim 2 wherein said switch is removably mounted in a receptacle on said carrier member.

7. The mirror assembly of claim 1 wherein said mirror element is a prismatic mirror element.

8. The mirror assembly of claim 7 wherein said carrier member includes a second lamp; said case including a second opening therethrough; said second lamp being mounted on said carrier member to provide illumination through said second opening in said case.

9. The mirror assembly of claim 7 wherein said carrier member includes a plug connection for connecting said circuit member to an external power source.

10. The mirror assembly of claim 9 wherein said assembly further includes a day/night actuator mounted for movement between day and night positions; said day/night actuator including an aperture therethrough in alignment with said plug connection and adapted to receive a connection to an external power source therethrough.

11. The mirror assembly of claim 1 wherein said carrier member is mounted for insertion in and removal from said case opening, said carrier member being accessible from the exterior of said case for said insertion and removal.

12. The mirror assembly of claim 11 wherein said carrier member includes a pair of opposed mounting flanges, each flange engaging said case adjacent said opening, at least one of said flanges being resilient and adapted for flexing to allow insertion and removal of said carrier member from said case exterior.

13. The mirror assembly of claim 11 wherein said carrier member includes a light opening for passage of light from said lamp to said case opening, and a lens mounted on said carrier member over said light opening.

14. The mirror assembly of claim 11 wherein said lamp includes a light bulb; said carrier member also including a reflector adapted to reflect light from said light bulb through said light opening, and an electrical switch, said switch connected to said circuit member to control operation of said light bulb.

15. The mirror assembly of claim 14 wherein said carrier member includes a light opening for passage of light from said lamp to said case opening, and a lens mounted on said carrier member over said light opening.

16. The mirror assembly of claim 15 wherein said reflector is formed from metal and includes a bulb-receiving aperture therethrough, said carrier member including a receptacle for mounting said reflector, said light bulb extending at least partially through said bulb-receiving aperture.

17. The mirror assembly of claim 15 wherein said carrier member includes a plug connection for connecting said circuit member to an external power source, said plug connection being aligned with a power source opening in said case through which connection to the external power source is made.

18. A rearview mirror assembly for vehicles comprising:
a case having a reflective mirror element, said case including at least one opening therethrough;
a support on said assembly for mounting said assembly on a vehicle;
a modular carrier member formed separately from and mounted to said case, said carrier member including an electrically conductive circuit member and a non-electrically conducting support body, said circuit member being formed separately from and secured to said support body, said carrier member providing an integral support, electrical connections for, and an electrical distribution network to at least one lamp on said assembly; and
a lamp mounted on said carrier member connected to said circuit member, and adapted to provide light through said case opening to a portion of the vehicle when said mirror assembly is mounted thereon;
said mirror element being a prismatic mirror element;
said carrier member including a second lamp; said case including a second opening therethrough; said second lamp being mounted on said carrier member to provide illumination through said second opening in said case;
a pair of electrical switches mounted on said carrier member and connected to said circuit member, one switch connected for operation of said lamp, the other switch connected for operation of said second lamp.

19. The mirror assembly of claim 18 wherein said case includes a pair of switch openings therethrough, one switch opening aligned with one of said switches, the other switch opening aligned with said other switch; a portion of each switch extending through its respective switch opening for access and operation of said lamps.

20. The mirror assembly of claim 18 wherein each of said opening and said second opening include a lens removably mounted therein.

21. The mirror assembly of claim 20 wherein said case includes opposite ends; said assembly further including a day/night actuator mounted for movement between day and night positions; said lamp, said opening and one of said lenses, and said second lamp, second opening, and the other of said lenses being located and positioned on opposite sides of said day/night actuator adjacent said opposite ends of said case.

22. The mirror assembly of claim 18 including a reflector for each of said lamps, said reflectors secured to said carrier member, said reflectors each having a reflective surface for reflecting light from its respective lamp through its respective case opening.

23. The mirror assembly of claim 22 wherein each of said reflectors includes a bulb receiving aperture and is removably secured to said carrier member; each of said lamps including a light bulb extending at least partially through said bulb-receiving aperture in its respective reflector.

24. The mirror assembly of claim 23 wherein said circuit member includes a pair of sets of bulb holders, one set mounting one of said light bulbs on said carrier member, the other of said sets mounting the other of said light bulbs on said carrier member; one of said reflectors being mounted in alignment with one set of said bulb holders, the other of said reflectors mounted in alignment with said other set of bulb holders.

25. The mirror assembly of claim 23 wherein said carrier member includes a pair of slots, one slot adjacent each of said sets of bulb holders; one of said reflectors including a mounting flange slidably received in and mating with one of said slots, the other of said reflectors including a mounting flange slidably received in and mating with the other of said slots.

26. The mirror assembly of claim 25 wherein each of said slots and reflector mounting flanges are tapered and form a dovetail joint.

27. The mirror assembly of claim 23 wherein each of said reflectors is molded from a resinous material.

28. The mirror assembly of claim 27 wherein each of said reflectors includes a metalized reflective surface adjacent said light bulb.

29. The mirror assembly of claim 23 wherein each of said reflectors is formed from metal, said carrier member including a pair of receptacles, one receptacle mounting one of said metal reflectors, the other of said receptacles mounting the other of said metal reflectors.

30. The mirror assembly of claim 22 in combination with the vehicle having seating areas for both a driver and passenger in the vehicle; said mirror assembly being mounted within said vehicle; one of said lamps and reflectors providing illumination of said seating area for the driver of said vehicle, the other of said lamps and reflectors providing illumination of said seating area for the passenger of said vehicle.

31. A rearview mirror assembly for vehicles comprising:
a case having a reflective mirror element, said case including at least one opening therethrough;
a support on said assembly for mounting said assembly on a vehicle;
a modular carrier member formed separately from and mounted to said case, said carrier member including an electrically conductive circuit member and a non-electrically conducting support body, said circuit member being formed separately from and secured to said support body, said carrier member providing an integral support, electrical connections for, and an electrical distribution network to at least one lamp on said assembly; and
a lamp mounted on said carrier member, connected to said circuit member, and adapted to provide light through said case opening to a portion of the vehicle when said mirror assembly is mounted thereon;
said support body being molded from a non-electrically conductive, resinous material so as to at least partially encapsulate said circuit member, said circuit member including at least one set of connectors for electrical connection to said lamp, and a second set of connectors for electrical connection to a power source.

32. The mirror assembly of claim 31 wherein said first and second connectors extend outwardly from said molded support body.

33. The mirror assembly of claim 31 wherein said circuit member is a metal stamping;
   said support body being molded therearound except for said first and second sets of connectors which extend from said support body.

34. The mirror assembly of claim 31 wherein said carrier member includes at least one knock-out area extending at least partially therethrough, said knock-out area removing at least a portion of said circuit member to prevent interconnection and electrical shorting between portions of said electrical circuit member.

35. The mirror assembly of claim 31 wherein said connectors of at least one of said first and second sets of connectors have tapered ends adapted for plug-in insertion in electrical receptacles of an electrical component.

36. The mirror assembly of claim 31 wherein at least one of said first and second sets of connectors includes receptacles for receiving a plug-in light bulb.

37. The mirror assembly of claim 1 wherein said circuit member includes at least one set of connectors for electrical connection to said lamp and a second set of connectors for electrical connection to a power source.

38. The mirror assembly of claim 37 wherein said first and second connectors extend outwardly from said molded support body.

39. The mirror assembly of claim 1 wherein said case includes a rear wall and a peripheral side wall defining a front opening and a hollow interior; said mirror element having a periphery and received in said front opening; a bezel engaging said periphery of said mirror element and secured to said peripheral side wall to retain said mirror element within said case.

40. A rearview mirror assembly for vehicles comprising:
   a case having a reflective mirror element, said case including at least one opening therethrough;
   a support on said assembly for mounting said assembly on a vehicle;
   a modular carrier member formed separately from and mounted to said case, said carrier member including an electrically conductive circuit member and a non-electrically conducting support body, said circuit member being formed separately from and secured to said support body, said carrier member providing an integral support, electrical connections for, and an electrical distribution network to at least one lamp on said assembly; and
   a lamp mounted on said carrier member, connected to said circuit member, and adapted to provide light through said case opening to a portion of the vehicle when said mirror assembly is mounted thereon;
   said case being formed from molded resinous material which is flexible when warm after molding and includes a rear wall and a peripheral side wall defining a front opening and a hollow interior; said mirror element having a periphery and received in said front opening; said peripheral side wall including a lip engaging the front surface of said mirror element to retain said mirror element within said case, said lip allowing snap-in insertion of said mirror element behind said lip while said case remains warm after molding.

41. The mirror assembly of claim 40 wherein said molded resinous material is at least one of polypropylene and a polypropylene/polyethylene copolymer having a heat deflection temperature less than about 190° F. at 66 psi and a shrinkage rate greater than about 0.010 inch/inch.

42. The mirror assembly of claim 1 wherein said mirror element is an electro-optic mirror element.

43. A rearview mirror assembly for vehicles comprising:
   a case having a reflective mirror element;
   a support on said assembly for mounting said assembly on a vehicle;
   a modular carrier member formed separately from and mounted on said case, said carrier member including an electrically conductive circuit member and a non-electrically conductive support body, said circuit member including a plurality of bus strips, said bus strips supported by and separated and electrically insulated from one another by said support body, said circuit member being formed separately from and secured to said support body, said carrier member providing an integral support, electrical connections for, and an electrical distribution network to at least one electrical component on assembly; and
   an electrical component mounted on said carrier member, said component being connected to said circuit member for operation on said mirror assembly.

44. The mirror assembly of claim 43 wherein said carrier member also includes an electrical switch connected to said circuit member for controlling operation of said electrical component; said case having an exterior surface; said electrical switch being accessible for operation at said exterior surface of said case.

45. The mirror assembly of claim 44, wherein said carrier member further includes a plug connection for connecting said circuit member to an external power source.

46. The mirror assembly of claim 44 wherein said electrical component is a lamp; said case including at least one opening therethrough; said lamp being mounted on said carrier member to provide illumination through said opening through said case.

47. The mirror assembly of claim 46 wherein said carrier member includes a second lamp and a second electrical switch for controlling operation of said second lamp; said case including a second opening therethrough; said second lamp being mounted to said carrier member to provide illumination through said second opening in said case.

48. The mirror assembly of claim 47 wherein said mirror element is a prismatic mirror element; said mirror assembly further including a day/night actuator mounted for movement between day and night positions on said case; said lamp and opening being located adjacent one side of said actuator; said second lamp and second opening being located adjacent another side of said actuator.

49. The mirror assembly of claim 47 wherein said mirror element is an electro-optic mirror element.

50. The mirror assembly of claim 43 wherein said electrical component is a lamp; said case including at least one opening therethrough; said lamp being mounted on said carrier member to provide illumination through said opening through said case.

51. A rearview mirror assembly for vehicles comprising:
   a case having a reflective mirror element;
   a support on said assembly for mounting said assembly on a vehicle;
   a modular carrier member formed separately from and mounted on said case, said carrier member including an electrically conductive circuit member and a support body, said circuit member being formed separately from and secured to said support body, said carrier member providing an integral support, electrical connections for, and an electrical distribution network to at least one electrical component on said assembly; and an electrical component mounted on said carrier member, said component being connected to said circuit member for operation on said mirror assembly;

said support body being molded from a non-electrically conductive, resinous material so as to at least partially encapsulate said circuit member, said circuit member including at least one set of connectors for electrical connection to said electrical component, and a second set of connectors for electrical connection to a power source.

52. The mirror assembly of claim 51 where said first and second sets of connectors extend from said molded support body.

53. A rearview mirror assembly for vehicles comprising:
a case having a reflective mirror element;
a support on said assembly for mounting said assembly on a vehicle;
a modular carrier member formed separately from and mounted on said case, said carrier member including an electrically conductive circuit member and a support body, said circuit member being formed separately from and secured to said support body, said carrier member providing an integral support, electrical connections for, and an electrical distribution network to at least one electrical component on said assembly; and
an electrical component mounted on said carrier member, said component being connected to said circuit member for operation on said mirror assembly;
said circuit member being a metal stamping; said support body being molded therearound.

54. The mirror assembly of claim 53 wherein said circuit member includes at least one set of connectors for electrical connection to said electrical component, and a second set of connectors for electrical connection to a power source; said first and second sets of connectors extending from said support body.

55. The mirror assembly of claim 51 wherein said carrier member includes at least one knock-out area extending at least partially therethrough, said knock-out area removing at least a portion of said circuit member to prevent interconnection and electrical shorting between portions of said electrical circuit member.

56. The mirror assembly of claim 51 wherein said connectors of at least one of said first and second sets of connectors have tapered ends adapted for plug-in insertion in electrical receptacles of an electrical component.

57. The mirror assembly of claim 51 wherein at least one of said first and second sets of connectors includes receptacles for receiving a plug-in light bulb.

58. The mirror assembly of claim 43 wherein said circuit member includes at least one set of connectors for electrical connection to said electrical component, and a second set of connectors for electrical connection to a power source, said first and second connectors extending from said support body.

59. A mirror assembly for vehicles comprising:
a one-piece case molded from a polymer resin, said case having a reflective mirror element and a lip for retaining said reflective mirror element within said case;
a support on said assembly for mounting said assembly on a vehicle;
a modular carrier member formed separately from and mounted on said case, said carrier member including an electrically conductive circuit member and a support body, said circuit member being formed separately from and secured to said support body, said carrier member providing an integral support, electrical connections for, and an electrical distribution network to at least one electrical component on said case; and an electrical component mounted on said carrier member, said component being connected to said circuit member for operation on said mirror assembly;

said lip allowing snap-in insertion of said mirror element behind said lip while said case remains warm after molding.

60. The mirror assembly of claim 59 wherein said polymer resin is a polyolefin resin.

61. The mirror assembly of claim 60 wherein said polymer resin is one of polypropylene and a polypropylene/polyethylene copolymer.

62. The mirror assembly of claim 59 wherein said polymer resin has a shrinkage rate greater than about 0.010 inch/inch.

63. A method for assembling a modular rearview mirror for vehicles comprising the steps of:

1) providing a mirror case for supporting a reflective mirror element and a lamp for illuminating a portion of a vehicle;

2) forming a modular carrier member by securing a separate, electrically conductive, circuit member having a plurality of bus strips thereon to a non-electrically conductive support body and supporting said bus strips on said support body while separating and electrically insulating said bus strips from one another with portions of said support body;

3) forming a subassembly by connecting said lamp to said bus strips on said modular carrier member to provide both support and electrical connections for said lamp;

4) mounting said modular carrier member and lamp subassembly on said mirror case such that said lamp is in registry with an opening in said case;

5) mounting a reflective mirror element on said mirror case such that said modular carrier member is concealed on said mirror case while said lamp is positioned to provide illumination through said opening in said case when said rearview mirror is mounted on a vehicle.

64. A method for assembling a modular rearview mirror for vehicles comprising the steps of:

1) providing a mirror case for supporting a reflective mirror element and a lamp for illuminating a portion of a vehicle;

2) forming a modular carrier member by securing a separate, electrically conductive, circuit member to a non-electrically conductive support body, said securing including at least partially encapsulating said circuit member within said support body;

3) forming a subassembly by connecting said lamp to said modular carrier member to provide both support and electrical connections for said lamp;

4) mounting said modular carrier member and lamp subassembly on said mirror case such that said lamp is in registry with an opening in said case;

5) mounting a reflective mirror element on said mirror case such that said modular carrier member is concealed on said mirror case while said lamp is positioned to provide illumination through said opening in said case when said rearview mirror is mounted on a vehicle.

65. The method of claim 64 wherein said forming of said modular carrier member includes insert molding said circuit member in said support body such that at least portions thereof extend out of said body.

66. The method of claim 65 wherein said molding is selected from the group consisting of injection molding, compression molding, extrusion molding, reaction injection molding and casting.

67. The method of claim 65 including forming said circuit member from metal and molding said support body from a resinous, polymeric material.

68. The method of claim 63 wherein said mounting of said reflective mirror element includes inserting said mirror element within the hollow interior of said mirror case and attaching a bezel to said case over the periphery of said mirror element.

69. A method for assembling a modular rearview mirror for vehicles comprising of:
 1) providing a mirror case for supporting a reflective mirror element and a lamp for illuminating a portion of a vehicle;
 2) forming a modular carrier member by securing a separate, electrically conductive, circuit member to a non-electrically conductive support body;
 3) forming a subassembly by connecting said lamp to said modular carrier member to provide both support and electrical connections for said lamp;
 4) mounting said modular carrier member and lamp subassembly on said mirror case such that said lamp is in registry with an opening in said case;
 5) mounting a reflective mirror element on said mirror case such that said modular carrier member is concealed on said mirror case while said lamp is positioned to provide illumination through said in said case when said rearview mirror is mounted on a vehicle;

said providing of said mirror case including molding said mirror case from a resinous, thermoplastic material and molding a lip on a peripheral wall of said mirror case; said mounting of said mirror element including inserting said mirror element within the hollow/interior of said mirror case while said case and lip are still warm and flexible after molding such that the periphery of said mirror element is engaged and retained by said lip.

70. A method for assembling a modular rearview mirror for vehicles comprising the steps of:
 1) providing a mirror case for supporting a reflective mirror element and a lamp for illuminating a portion of a vehicle;
 2) forming a modular carrier member by securing a separate, electrically conductive, circuit member to a non-electrically conductive support body;
 3) forming a subassembly by connecting said lamp to said modular carrier member to provide both support and electrical connections for said lamp;
 4) mounting said modular carrier member and lamp subassembly on said mirror case such that said lamp is in registry with an opening in said case;
 5) mounting a reflective mirror element on said mirror case such that said modular carrier member is concealed on said mirror case while said lamp is positioned to provide illumination through said opening in said case when said rearview mirror is mounted on a vehicle;

said forming of said modular carrier member including forming said support body in two sections and fastening said sections together at least partially around said circuit member.

71. The method of claim 63 wherein said forming of said modular carrier member includes forming said support body and attaching said separate circuit member to at least one surface of said support body.

* * * * *

UNITED STATES PATENT AND TRADEMARK OFFICE
CERTIFICATE OF CORRECTION

PATENT NO. : 5,669,698
DATED : Sept. 23, 1997
INVENTOR(S) : Roger L. Veldman

It is certified that error appears in the above-identified patent and that said Letters Patent is hereby corrected as shown below:

Column 6, line 50:
"time" should be --lime--.
Column 7, line 38:
Delete "the" (second occurrence).
Column 11, lines 47-48:
"now U.S. Patent No. 5,521,760" should be deleted.
Column 12, line 59:
"64a" should be --64a'--.
Column 16, line 21:
"Electrooptic" should be --Electro-optic--.
Column 16, line 46:
"electrooptic should be --electro-optic--.

Signed and Sealed this

Fourteenth Day of December, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,669,698
DATED : Sept. 23, 1997
INVENTOR(S) : Roger L. Veldman

It is certified that error appears in the above-identified patent and that said Letters Patent is hereby corrected as shown below:

Claim 43, line 23:
        Insert --said-- between "on" and "assembly".
    Claim 69, line 21:
        Insert --the steps-- between "comprising" and "of".
    Claim 69, line 38:
        Insert --opening-- between "said" and "in".

Signed and Sealed this

Fifth Day of September, 2000

Attest:

Q. TODD DICKINSON

*Attesting Officer*      *Director of Patents and Trademarks*